(12) United States Patent
Hashimoto

(10) Patent No.: US 10,599,333 B2
(45) Date of Patent: Mar. 24, 2020

(54) STORAGE DEVICE HAVING DUAL ACCESS PROCEDURES

(71) Applicant: TOSHIBA MEMORY CORPORATION, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 89 days.

(21) Appl. No.: 15/253,692

(22) Filed: Aug. 31, 2016

(65) Prior Publication Data

US 2017/0262177 A1    Sep. 14, 2017

Related U.S. Application Data

(60) Provisional application No. 62/305,909, filed on Mar. 9, 2016.

(51) Int. Cl.
*G06F 3/06*         (2006.01)
*G06F 12/02*        (2006.01)

(52) U.S. Cl.
CPC .......... *G06F 3/0604* (2013.01); *G06F 3/0659* (2013.01); *G06F 3/0665* (2013.01); *G06F 3/0688* (2013.01); *G06F 12/0246* (2013.01); *G06F 2212/1024* (2013.01); *G06F 2212/1044* (2013.01); *G06F 2212/214* (2013.01); *G06F 2212/261* (2013.01); *G06F 2212/7201* (2013.01); *G06F 2212/7205* (2013.01); *G06F 2212/7208* (2013.01)

(58) Field of Classification Search
CPC .. G06F 3/0604; G06F 3/0659; G06F 12/0246; G06F 2212/7201
See application file for complete search history.

(56) References Cited

U.S. PATENT DOCUMENTS 8,539,315 B2    9/2013  Hashimoto
8,984,375 B2    3/2015  Hashimoto
(Continued)

FOREIGN PATENT DOCUMENTS

WO    2014039845 A1    3/2014
WO    2014039922 A2    3/2014

OTHER PUBLICATIONS

Zhang et al., De-indirection for flash-based SSDs with nameless writes, FAST, 2012 [retrieved from internet Jan. 25, 2018][<URL:https://www.usenix.org/legacy/event/fast12/tech/full_papers/Zhang2-7-12.pdf>] (Year: 2012).*

(Continued)

*Primary Examiner* — Daniel D Tsui
*Assistant Examiner* — Nicholas A. Paperno
(74) *Attorney, Agent, or Firm* — Kim & Stewart LLP

(57) ABSTRACT

A storage device includes a nonvolatile semiconductor memory device, and a controller configured to access the nonvolatile semiconductor memory device. When the controller receives a write command including a logical address, the controller determines a physical location of the memory device in which data are written and stores a mapping from the logical address to the physical location. When the controller receives a write command without a logical address, the controller determines a physical location of the memory device in which data are written and returns the physical location.

16 Claims, 23 Drawing Sheets

(56) References Cited

U.S. PATENT DOCUMENTS

| | | |
|---|---|---|
| 2015/0074371 A1 | 3/2015 | Hashimoto et al. |
| 2015/0186270 A1* | 7/2015 | Peng .................... G11C 16/16 |
| | | 711/3 |
| 2015/0331790 A1* | 11/2015 | Kishi ................ G06F 12/0246 |
| | | 711/103 |
| 2015/0370700 A1* | 12/2015 | Sabol ................ G06F 12/0246 |
| | | 711/103 |
| 2016/0034354 A1 | 2/2016 | Hashimoto et al. |

OTHER PUBLICATIONS

Jeong-Uk Kang et., "The Multi-streamed Solid-State Drive", Proceedings of the 6th USENIX Conference on Hot Topics in Storage and File Systems, Jun. 17-18, 2014, 5 pages [<URL:https://www.usenix.org/system/files/conference/hotstorage14/hotstorage14-paper-kang.pdf>] (Year: 2014).*
U.S. Appl. No. 62/153,655, filed Apr. 28, 2015.
U.S. Appl. No. 62/138,315, filed Mar. 25, 2015.
U.S. Appl. No. 62/142,937, filed Apr. 3, 2015.

* cited by examiner

FIG. 12

Block Mapping Table 46

Input Block Table 62 for Logical Access

| Block Address | Page address to be written | Erase Count |
|---|---|---|
| ... | ... | ... |
| ... | ... | ... |

Input Block Table 64 for Physical Access

| Block Address | Page address to be written | Erase Count |
|---|---|---|
| ... | ... | ... |
| ... | ... | ... |

Active Block Table 63 for Logical Access

| Block Address | Erase Count |
|---|---|
| ... | ... |
| ... | ... |
| ... | ... |

Active Block Table 65 for Physical Access

| Block Address | Erase Count |
|---|---|
| ... | ... |
| ... | ... |
| ... | ... |

Free Block Table 66

| Block Address | Erase Count |
|---|---|
| ... | ... |
| ... | ... |
| ... | ... |

Bad Block Table 67

| Block Address | Erase Count |
|---|---|
| ... | ... |
| ... | ... |
| ... | ... |

STORAGE DEVICE HAVING DUAL ACCESS PROCEDURES

CROSS-REFERENCE TO RELATED APPLICATION

This application is based upon and claims the benefit of priority from Provisional Application No. 62/305,909, filed Mar. 9, 2016, the entire contents of which are incorporated herein by reference.

FIELD

The present disclosure generally relates to a storage system including a host and a storage device, in particular, a storage device that has dual access procedures.

BACKGROUND

A storage system of one type includes a host device and one or more storage devices connected to the host device. In such a storage system, the host device manages and controls access to the one or more storage devices, i.e., data writing to and data reading from the one or more storage devices. For example, when the host device reads data from a storage device connected thereto, the host device sends a read command to the storage device, and the storage device reads data stored in a physical location of the storage device designated by the read command. Such designation of the physical location by the host device may be made by the physical location itself, or by a logical address corresponding to the physical location when the host device carries out data management using logical addresses

DESCRIPTION OF THE DRAWINGS

FIG. 12 illustrates an example of a block mapping table (BMT) according to the embodiment.

DETAILED DESCRIPTION

According to an embodiment, a storage device includes a nonvolatile semiconductor memory device, and a controller configured to access the nonvolatile semiconductor memory device. When the controller receives a write command including a logical address, the controller determines a physical location of the memory device in which data are written and stores mapping from the logical address to the physical location. When the controller receives a write command without a logical address, the controller determines a physical location of the memory device in which data are written and returns the physical location.

According to another embodiment, a storage device includes a nonvolatile semiconductor memory device, and a controller configured to access the nonvolatile semiconductor memory device. When the controller receives a read command including a logical address and no physical address, the controller determines a physical location of the memory device from which data are read by referring to a logical-to-physical mapping. When the controller receives a read command including a physical address and no logical address, the controller determines a physical location of the memory device from which data are read from the physical address.

Details of the present disclosure are described below with reference to the drawings.

[Storage System]

Figure 1:
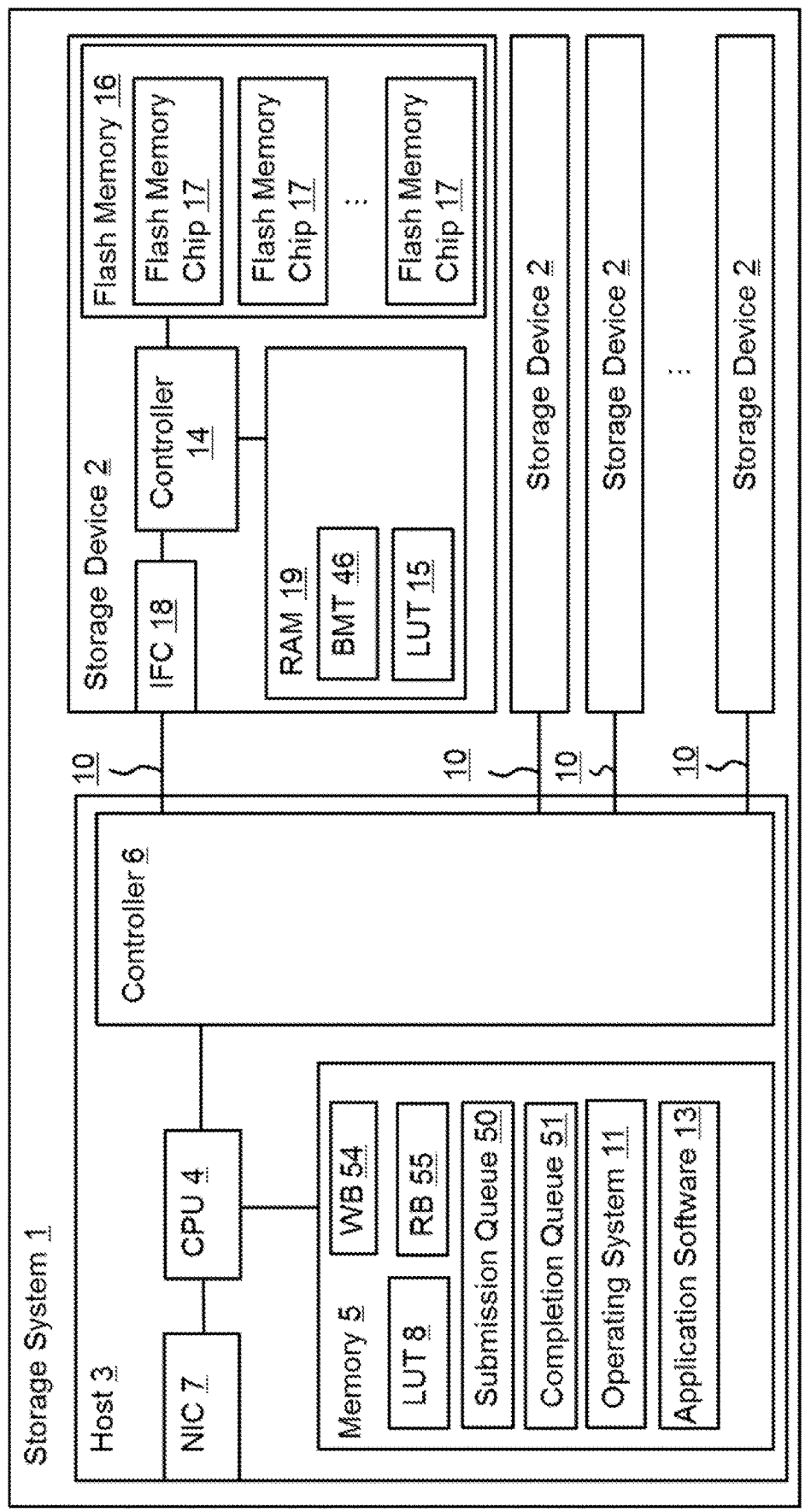
FIG. 1 illustrates a configuration of a storage system, which includes a host and at least a storage device, according to an embodiment.
Figure 2:
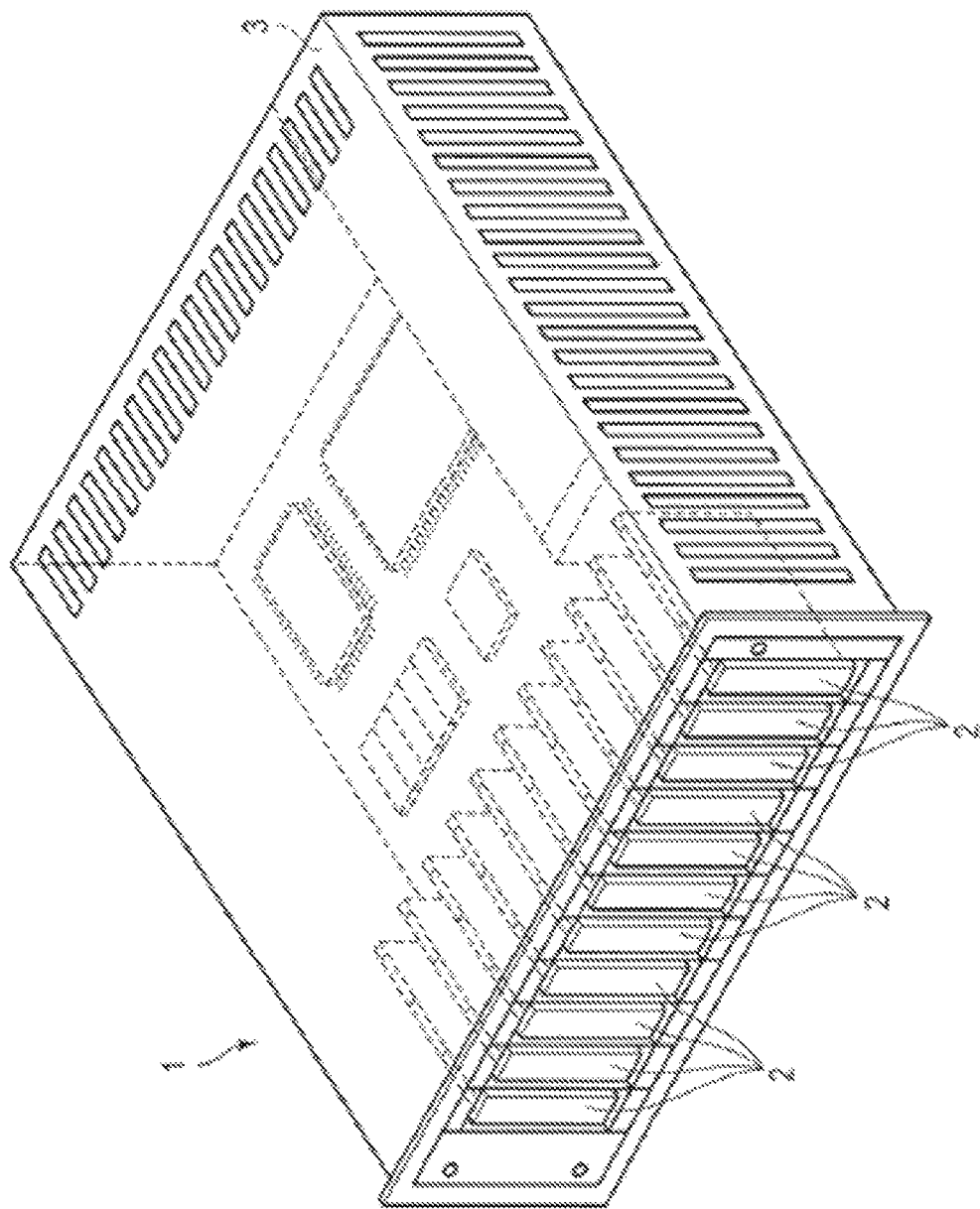
FIG. 2 illustrates a physical configuration of the storage system according to the embodiment.

FIG. 1 illustrates a configuration of a storage system 1 according to an embodiment. The storage system 1 includes a host 3, one or more storage devices 2, and an interface 10 configured to connect the host 3 and each of the storage devices 2. In the present embodiment, the storage system 1 is a 2U storage appliance shown in FIG. 2. That is, the host 3 and the one or more storage devices 2 are enclosed in a housing having a size of the 2U storage appliance. Each of the storage devices 2 is a nonvolatile storage device such as a 2.5 inch form factor, 3.5 inch form factor, M.2 form factor or an Add-In Card (AIC) form factor. Further, in the present embodiment, the interface 10 employs PCI Express (Peripheral Component Interconnect Express, PCIe) interface. Alternatively, the interface 10 can employ any other technically feasible protocol, such as SAS (Serial Attached SCSI) protocol, USB (Universal Serial Bus), SATA (Serial Advanced Technology Attachment), Thunderbolt®, Ethernet®, Fibre channel, and the like.

The storage device 2 includes a controller 14, a random access memory (RAM) 19, a non-volatile semiconductor memory, such as a NAND flash memory 16 (hereinafter flash memory 16), and an interface controller (IFC) 18. The IFC 18 is configured to perform transmission and reception of signals to and from the host 3 via the interface 10. The controller 14 is configured to manage and control the flash memory 16, the RAM 19, and the IFC 18.

The RAM 19 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 19 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21 (See FIG. 4), such as Toggle and ONFI.

The host 3 includes a CPU 4, a memory 5, a controller 6, and a network interface controller (NIC) 7. The CPU (central processing unit) 4 is a central processing unit in the host 3, and performs various calculations and control operations of the host 3. The CPU 4 and the controller 6 are connected through an interface using a protocol such as PCI Express. The CPU 4 performs control of the storage device 2 via the controller 6. The controller 6 is a PCIe Switch and a PCIe expander in the present embodiment, but, a SAS expander, a RAID controller, a JBOD controller, a JBOF controller, and the like may be used as the controller 6. The CPU 4 also performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5. The CPU 4 is connected to the NIC 7, which is connected to an external network via a network interface. The network interface employs a protocol, for example, an Ethernet, InfiniBand, Fibre Channel, PCI Express Fabric, WiFi, and the like.

The memory 5 temporarily stores a program and data and functions as a working memory of the CPU 4. The memory 5 includes memory regions for storing the operating system (OS) 11, application software 13, a look-up table (LUT) 8, a submission queue 50, and a completion queue 51, and also includes a write buffer (WB) 54 and a read buffer (RB) 55. As is generally known, the OS 11 represents system software for managing the host 3, and may be a commodity OS such as Linux®, Windows®, or a virtualization software available from VMware, Inc. The OS 11 operates to manage an input to and an output from the host 3, the storage devices 2, and the memory 5. That is, the OS 11 enables software to use components in the storage system 1, including the storage devices 2. The OS 11 is used to control a manner of data writing to the storage devices 2 and data reading from the storage devices 2.

The write buffer 54 temporarily stores data to be written into the storage devices 2, i.e., write data. The read buffer (RB) 55 temporarily stores data read from the storage devices 2, i.e., read data. The LUT 8 is used to manage mapping between file IDs (object IDs) of data and physical addresses of a flash memory 16 and the write buffer memory 54 in which the data are stored for writes or to be stored for reads. The submission queue 50 contains, for example, commands and requests with respect to the storage devices 2. The completion queue 51 contains information indicating completion of the commands and requests and information related to the completion, which are sent to the host 3 upon completion of the commands and requests by the storage devices 2.

The host 3 sends, to the storage device 2 via the interface 10, a number of commands for data writing to and data reading from the storage device 2. The commands include a logical read command 80, a logical write command 81, a trim command 82, a host-initiated garbage collection (HIGC) command 83, a physical read command 90, a physical write command 91, an invalidate command 92, a copy command 93, and the like, as described below in detail (See FIG. 3).

Figure 3:
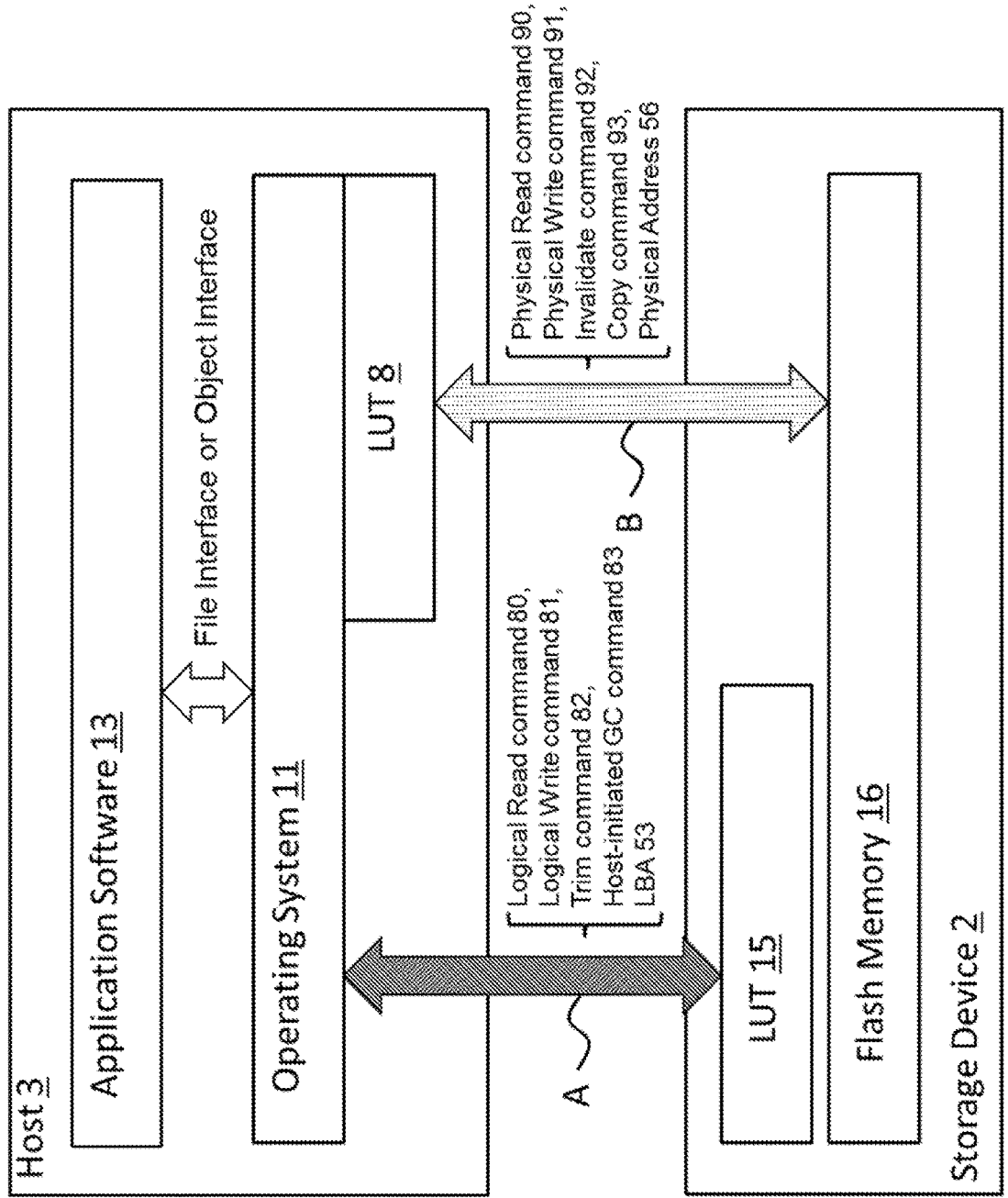
FIG. 3 illustrates a software layer structure of the host and communication architecture between the host and a storage device according to the embodiment.

In addition, one or more units of the application software 13 are loaded, respectively, in the memory 5. FIG. 3 illustrates a software layer structure of the host 3 and communication architecture between the host 3 and the storage device 2 according to the present embodiment. Usually, the application software 13 loaded in the memory 5 does not directly communicate with the storage device 2 and instead communicates with the storage device 2 through the OS 11 loaded in the memory 5 via a file interface and an object interface.

In the present embodiment, the OS 11 communicates with the storage device 2 in one or both of two operational procedures (logical access and physical access). When the logical access is carried out, the OS 11 operates to transmit commands including the logical read command 80, the logical write command 81, and the trim command 82, along with a logical block address (LBA) 53, to the storage device 2 via the interface 10 (shown by arrow A in FIG. 3). The LBA 53 is used to designate a logical location of the flash memory 16 to be accessed for data reading or data writing. When the physical access is carried out, the OS 11 operates to transmit commands including the physical read command 90, the physical write command 91, the invalidate command 92, and the copy command 93, and a physical address 56, to the storage device 2 via the interface 10 (shown by arrow B in FIG. 3). The physical address 56 is used to designate a physical logical location of the flash memory 16 to be accessed for data reading or data writing.

The application software 13 includes, for example, client software, database software (e.g., Cassandra DB, Mongo DB, HBASE, and etc.), Distributed Storage System (Ceph etc.), Virtual Machine (VM), guest OS, and Analytics Software (e.g., Hadoop, R, and etc.).

[Flash Memory Chip]

Figure 4:
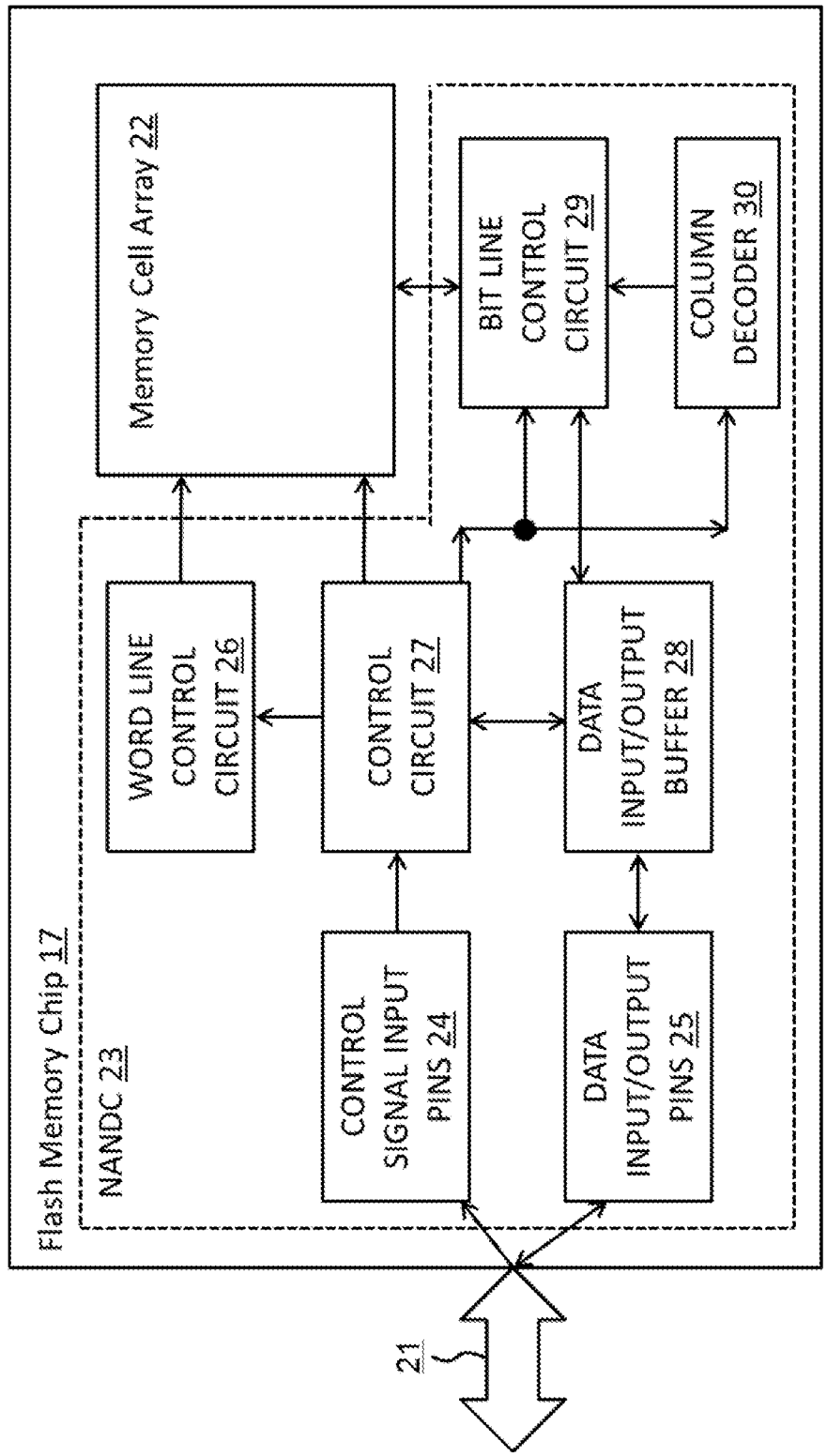
FIG. 4 illustrates a configuration of a flash memory chip in a storage device.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each of which stores data, as described below in detail. The NANDC 23 is a controller configured to control access to the memory cell array 22.

Specifically, the NANDC 23 includes control signal input pins 24, data input/output pins 25, a word line control circuit 26, a control circuit 27, a data input/output buffer 28, a bit line control circuit 29, and a column decoder 30. The control circuit 27 is connected to the control signal input pins 24, the word line control circuit 26, the data input/output buffer 28, the bit line control circuit 29, and the column decoder 30, and controls the entire operations of the circuit components of the NANDC 23. Also, the memory cell array 22 is connected to the word line control circuit 26 and the control circuit 27. Further, the control signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data are transferred to the controller 14 of the storage device 2 from the data input/output pins 25 through the flash interface 21. When data are written to the flash memory chip 17, data to be written (write data) are input to the data input/output buffer 28 through the data input/output pins 25. Then, the write data are transferred to the column decoder 30 through the control circuit 27, and input to the bit line control circuit 29 by the column decoder 30. The write data are written to memory cells of the memory cell array 22 with a timing controlled by the word line control circuit 26 and the bit line control circuit 29.

When control signals are input to the flash memory chip 17 from the controller 14 of the storage device 2 through the flash interface 21, the control signals are input through the control signal input pins 24 into the control circuit 27. Then, the control circuit 27 generates control signals, according to the control signals from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
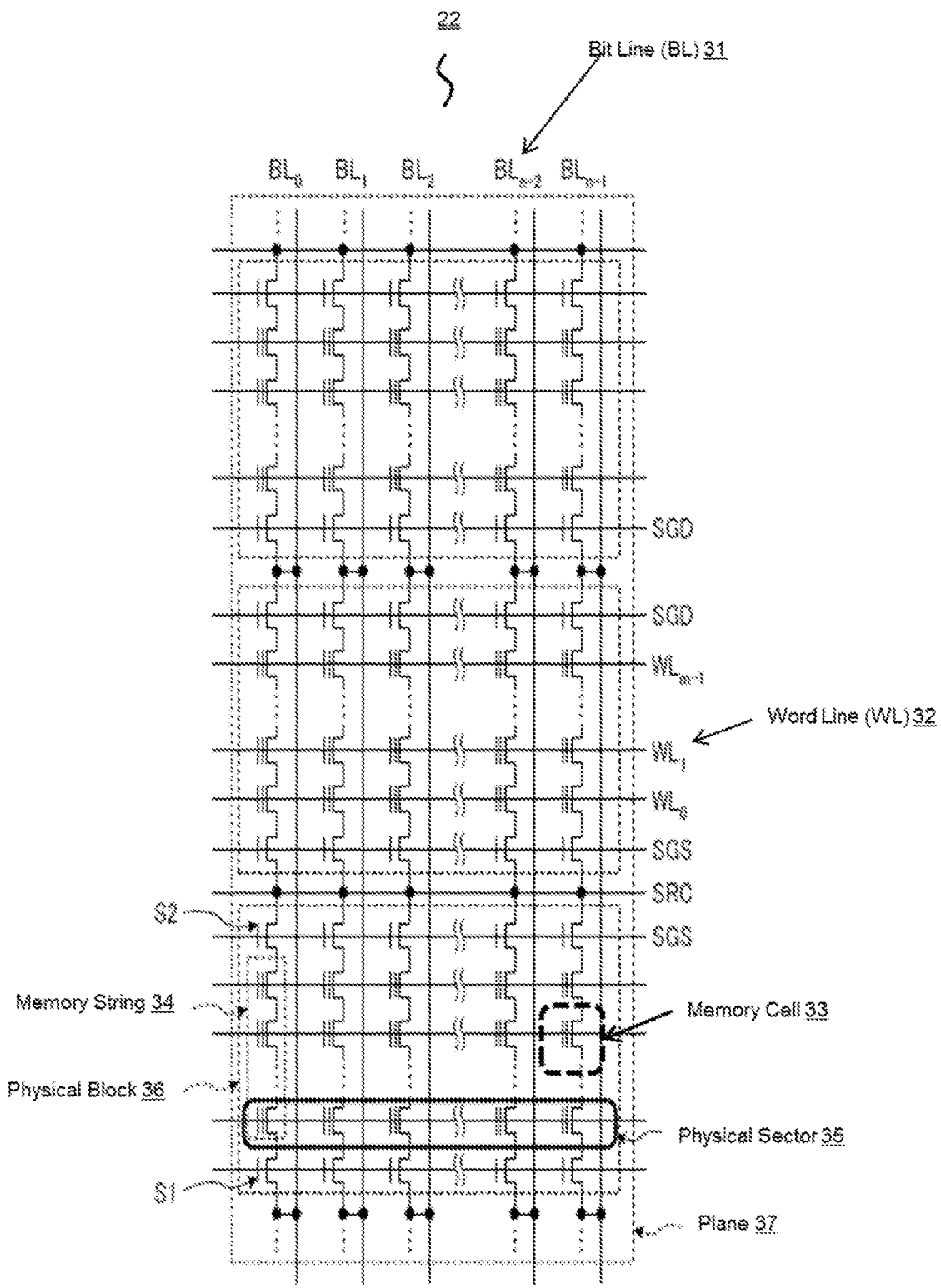
FIG. 5 illustrates a detailed circuit structure of a memory cell array in the flash memory chip.

FIG. 5 illustrates a detailed circuit structure of the memory cell array 22. The memory cell array 22 includes one or more planes 37 (only one of which is depicted in FIG. 5). Each plane 37 includes a plurality of physical blocks 36, and each physical block 36 includes a plurality of memory strings 34. Further, each of the memory strings (MSs) 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each memory string (MS) 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm-1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation (also referred to as a program operation), a read operation, and a program verify operation, one word line WL is selected according to a physical address, such as a row address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are allocated to the physical sector 35, as physical pages. A physical address comprises physical page addresses and physical block address. A physical page address is assigned to each of the physical pages, and a physical block address is assigned to each of the physical blocks 36.

Figure 6:
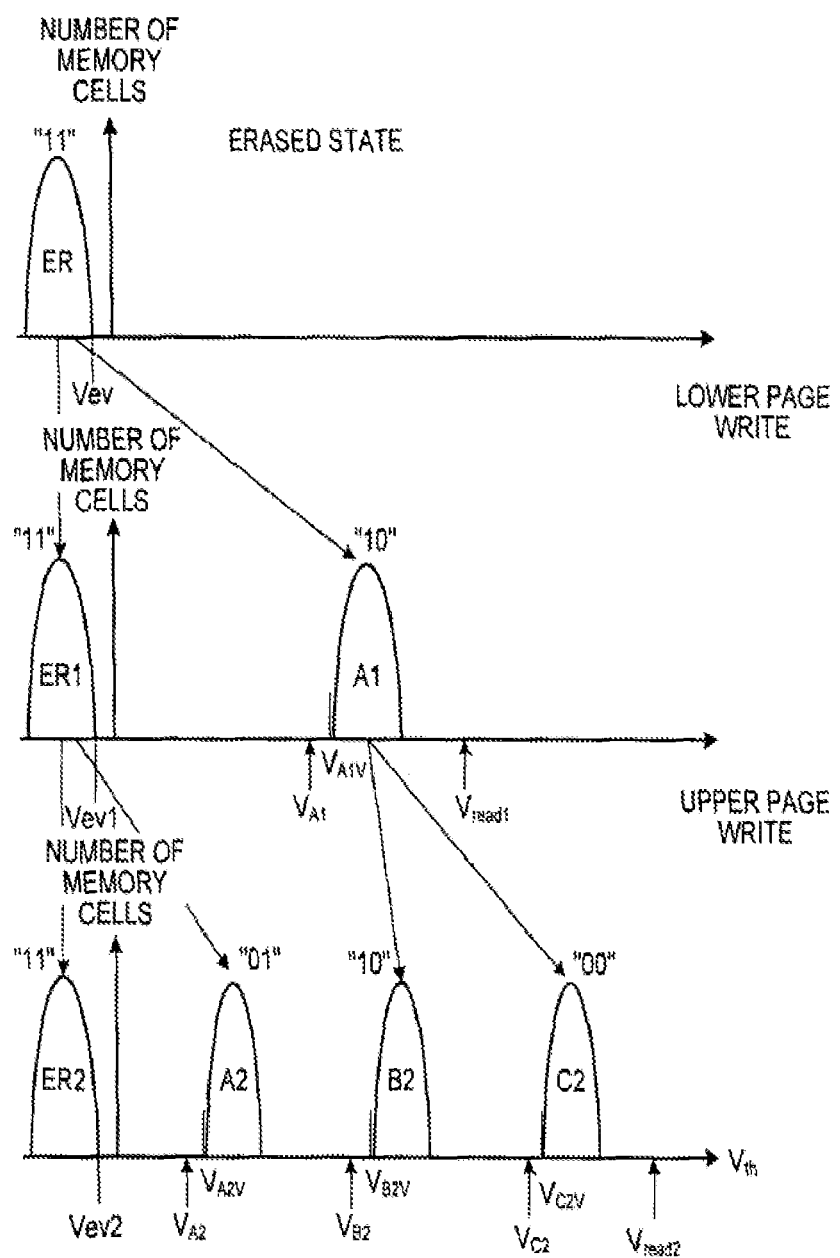
FIG. 6 illustrates a relation between 2-bit four-level data (data "11", "01", "10", and "00") stored in a memory cell of a four-level NAND cell type and a threshold voltage distribution of each level.

The four-level NAND memory of 2 bit/cell is configured such that a threshold voltage in one memory cell could have four kinds of distributions. FIG. 6 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, i.e., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data by varying the threshold voltage thereof.

In the present embodiment, each of the memory cells 33 employs a write system of a four-level store method for 2 bit/cell (MLC), using an upper page and a lower page. Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S. Pat. No. 8,189,391, United States Patent Application Publication No. 2010/0207195, and United States Patent Application Publication No. 2010/0254191, the entire contents of both applications are incorporated by reference herein.

[Address Structure]

Figure 7:
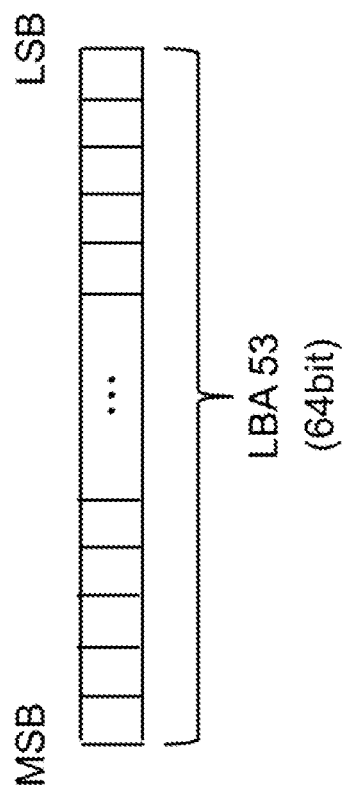
FIG. 7 illustrates an example of an address structure of a logical block address (LBA) according to the embodiment.

FIG. 7 illustrates an example of an address structure of the LBA 53 according to the present embodiment. The LBA 53 is transmitted via the interface 10 as a form of the address structure, when the OS 11 operates according to the procedure of the logical access. The LBA 53 is a logical address represented by a data string extending from a least significant bit (LSB) to a most significant bit (MSB) that has, for example, 64 bit.

Figure 8:
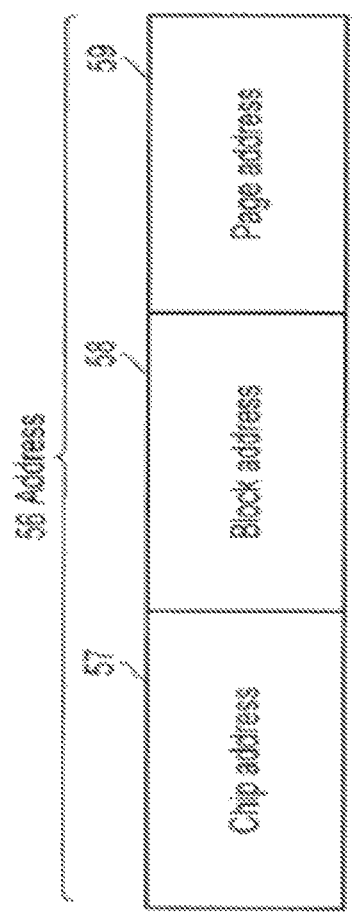
FIG. 8 illustrates a first example of an address structure of a physical block address according to the embodiment.

FIG. 8 illustrates a first example of an address structure of the physical address 56 according to the present embodiment. The physical address 56 is transmitted via the interface 10 as a form of the address structure shown in FIG. 8, when the OS 11 operates according to the procedure of the physical access. The address structure of the physical address 56 includes a chip address 57, a block address 58, and a page address 59. In the present embodiment, the chip address 57 is located at the MSB side of the address structure, and the page address 59 is located at the LSB side of the address structure in FIG. 8. However, the locations of the chip address 57, the block address 58, and the page address 59 in the LBA 53 can be determined arbitrarily.

Figure 9:
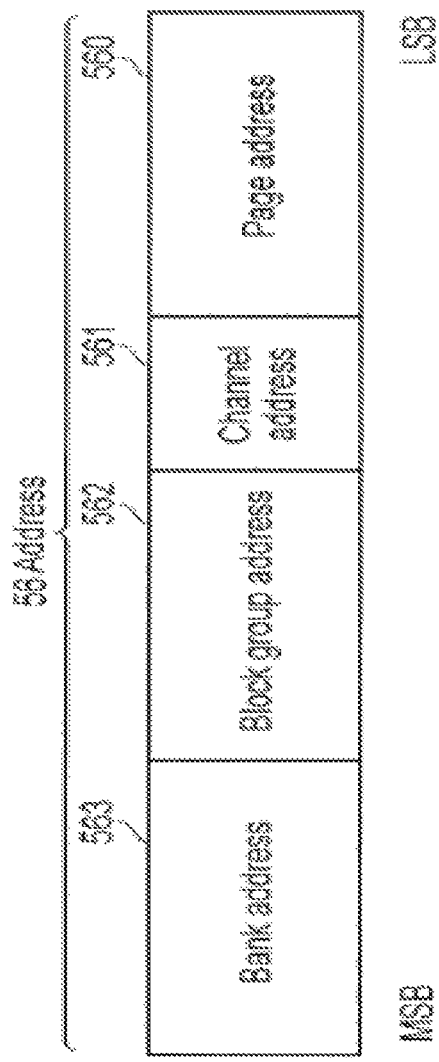
FIG. 9 illustrates a second example of the address structure of the physical block according to the embodiment.

FIG. 9 illustrates a second example of the address structure of the physical address 56 according to the present embodiment. The physical address 56 includes a bank address 563, a block group address 562, a channel address 561, and a page address 560. The bank address 563 corresponds to the chip address 57 in FIG. 8. The block group address 562 corresponds to the block address 58 in FIG. 8. The channel address 561 and the page address 560 correspond to the page address 59 in FIG. 8.

Figure 10:
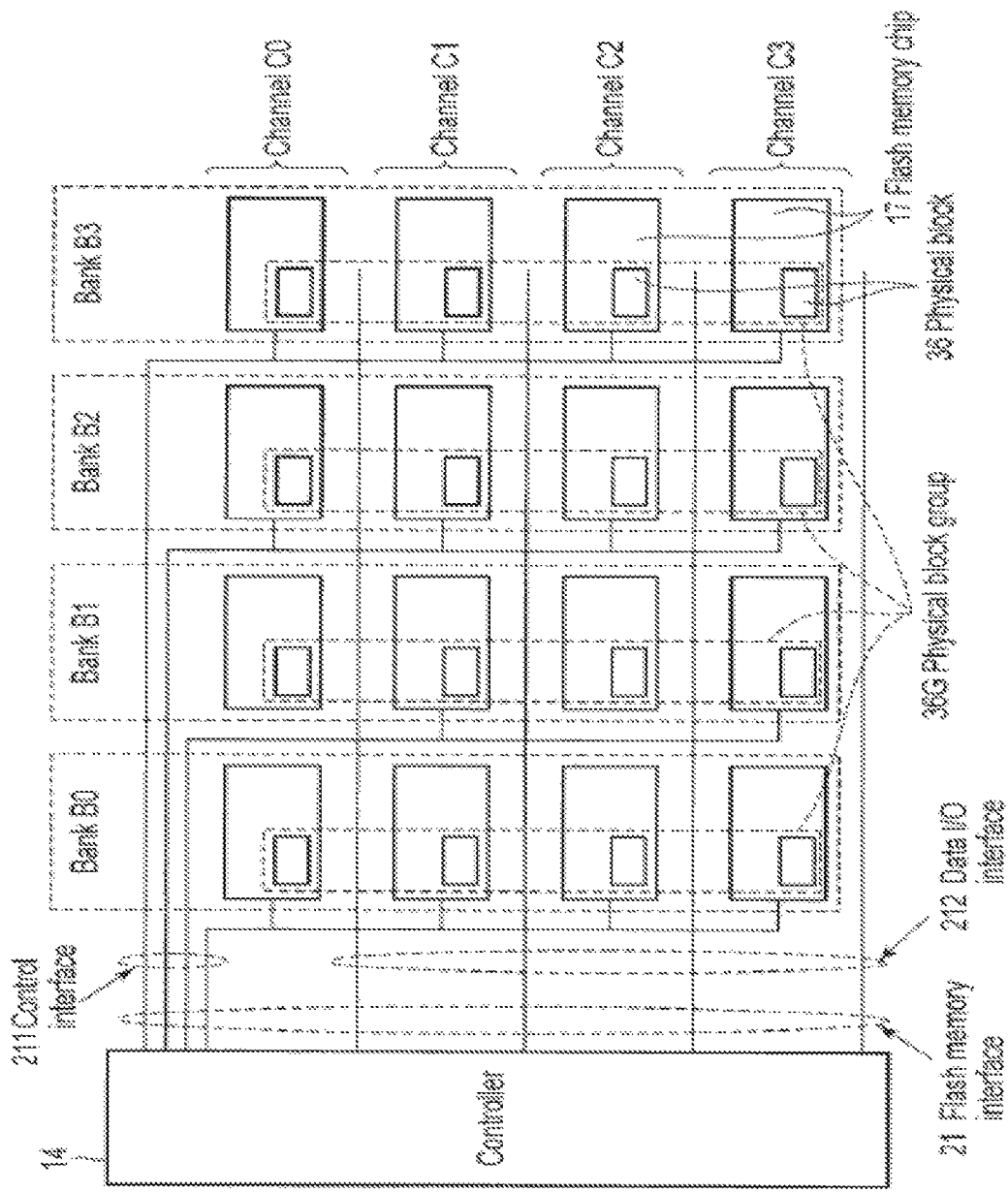
FIG. 10 illustrates a configuration of the flash memory according to the present embodiment and elements corresponding to each element of the physical address shown in FIG. 9.

FIG. 10 illustrates a configuration of the flash memory 16 according to the present embodiment and elements corresponding to each of the addresses shown in FIG. 9. In FIG. 10, the plurality of flash memory chips 17 are specified by channel groups C0-C3 and bank groups B0-B3, which intersect with each other. The flash memory interface 21 between the controller 14 and the flash memory chip 17 includes a plurality of data I/O interfaces 212 and a plurality of control interfaces 211. Flash memory chips 17 that share a common data I/O interface 212 belong to a common channel group. Similarly, flash memory chips 17 that share a common bus of the control interface 211 belong to a common bank group.

According to this sharing of the bus, a plurality of flash memory chips 17 that belong to the same bank group can be accessed in parallel through driving of the plurality of channels. Also, the plurality of banks can be operated in parallel through an interleave access. The controller 14 fetches, from the submission queue 50, a command to access a bank in an idle state with priority to a command to access a busy bank, in order to perform a more efficient parallel operation. Physical blocks 36 that belong to the same bank and are associated with the same physical block address belong to the same physical block group 36G, and assigned a physical block group address corresponding to the physical block address.

In an embodiment, the physical block group 36G of the plurality of physical blocks 36 is set as a unit of erasing data, and the physical block group address is set as a management unit in the block mapping table (BMT) 46. As result, the size of the BMT 46 can be reduced, and the size of the RAM 19 can be reduced. More specifically, the size of the BMT 46 that is loaded when the storage device 2 is booted can be reduced, and as a result, the boot time of the storage device 2 can be shortened.

[Block Mapping]

Figure 11:
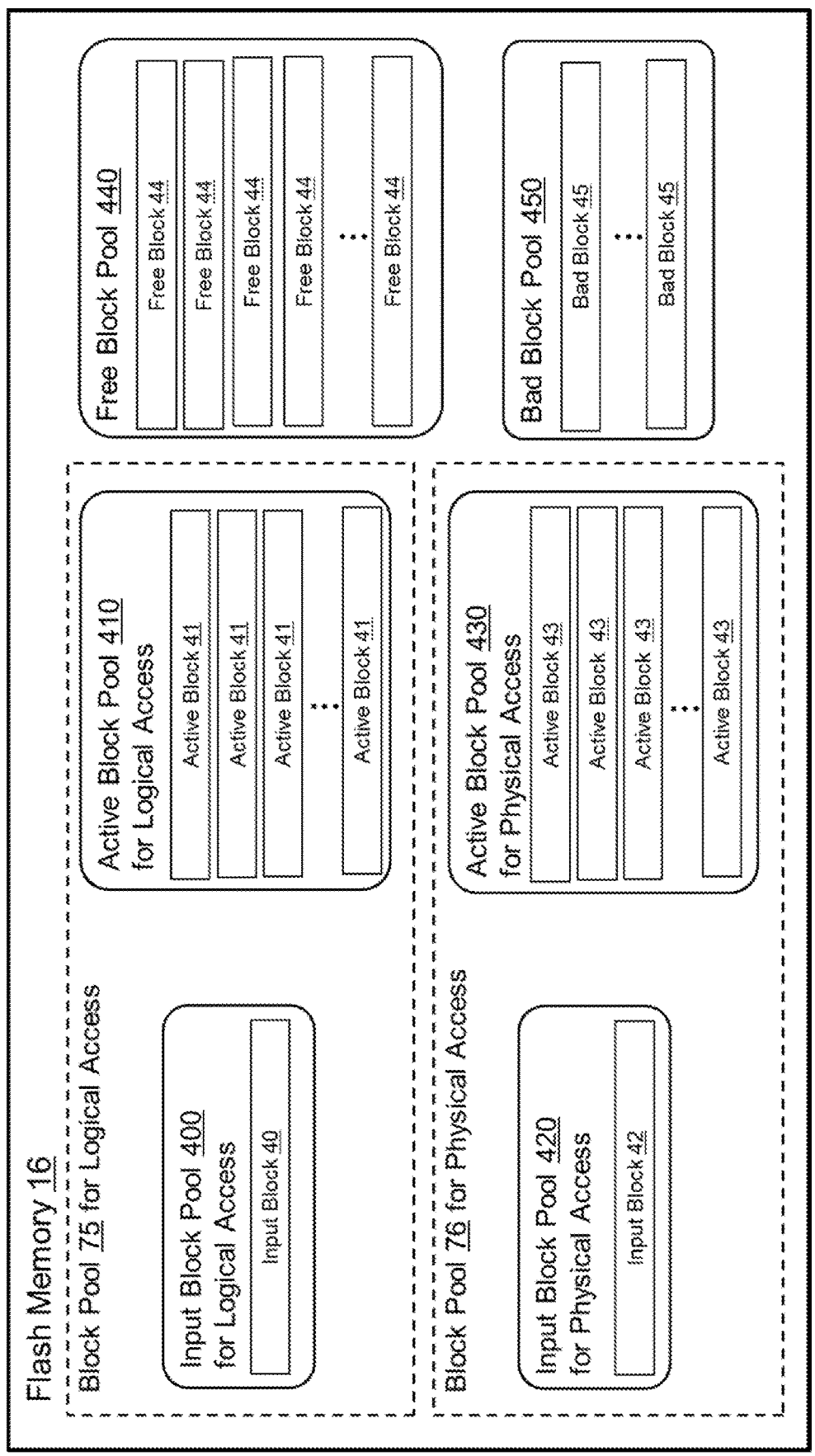
FIG. 11 illustrates an overview of mapping of physical blocks based on block pools in the embodiment.

FIG. 11 illustrates an overview of mapping of physical blocks based on block pools in the present embodiment. As described above, the mapping is managed using the block mapping table (BMT) 46 stored in the RAM 19. The block pools include an input block pool 400 for logical access, an active block pool 410 for logical access, an input block pool 420 for physical access, an active block pool 430 for physical access, a free block pool 440, and a bad block pool 450. The mappings of physical blocks are managed by the controller 14, and when a physical block is remapped into a different block pool, the controller updates the mappings in the block mapping table (BMT) 46. The controller 14 maps each of the physical blocks of the flash memory 16 to one of the block pools, in the BMT 46.

The input block pool 400 for logical access includes at least one input block 40. The input block 40 is a block in which data are written when the OS 11 operates according to the procedure of the logical access. The input block 40 may store no data, or include both a written region and an unwritten region in which data can be written.

The input block 40 for logical access is generated from a free block 44 in the free block pool 440. For example, a free block 44 that has been subjected to erasing operations the smallest number of times may be selected as a target block to be remapped as the input block 40. Alternatively, a free block 44 that has been subjected to erasing operations less than a predetermined number of times may be selected as the target block.

The active block pool 410 for logical access includes one or more active blocks 41 for logical access. The active block 41 is a physical block that no longer has a writable region (i.e., becomes full of data written during the logical access). Also, at least some of the written data in the active block 41 are valid data.

The input block pool 420 for physical access includes at least one input block 42. The input block 42 is a physical block in which data are written when the OS 11 operates according to the procedure of the physical access. The input block 42 may store no data, or include both a written region and an unwritten region in which data can be written.

Similarly to the input block 40 for logical access, the input block 42 for physical access is generated from a free block 44 in the free block pool 440. For example, a free block 44 that has been subjected to erasing operations the smallest number of times may be selected as a target block to be remapped as the input block 42. Alternatively, a free block 44 that has been subjected to erasing operations less than a predetermined number of times may be selected as the target block.

The active block pool 430 for physical access includes one or more active blocks 43 for physical access. The active block 43 is a physical block that no longer has a writable region (i.e., becomes full of data written during the physical access). Also, at least some of the written data in the active block 43 are valid data.

The free block pool 440 includes one or more free blocks 44. The free block 44 includes physical blocks that have not stored any data previously and physical blocks that store no valid data. That is, all data stored in the free block 44, if any, have been invalidated.

The bad block pool 450 includes one or more bad blocks 45. The bad block 45 is a block that cannot be used for data writing, for example, because of defects.

FIG. 12 illustrates an example of the block mapping table (BMT) 46 according to the present embodiment. The BMT 46 includes an input block table 62 for logical access, an active block table 63 for logical access, an input block table for physical access 64, an active block table for physical access 65, a free block table 66, and a bad block table 67. In each of the tables 62-67 of the BMT 46, each entry indicates correspondence between a block address and an erase count, which indicates a number of times data in the block address have been erased. Other configurations of different types of block pools may be also managed in the BMT 46.

The input block table 62 for logical access and the input block table 64 for physical access also indicate a physical page address (PPA) in which next write data are to be written. When the controller 14 remaps a free block 44 in the free block pool 440 as an input block 40 for logical access, the controller 14 removes a block address of the free block 44 from the free block table 66, and adds a new entry including the block address and PPA=0 to the input block table 62 for logical access. Similarly when the controller 14 remaps a free block 44 in the free block pool 440 as an input block 42 for physical access, the controller 14 removes a block address of the free block 44 from the free block table 66, and adds a new entry including the block address and PPA=0 to the input block table 64 for physical access.

When the controller 14 carries out a write operation of data to an input block 40 for logical access, the controller 14 specifies a PPA by referring to the input block table 62 for logical access, writes the data to the specified page address in the input block 40, and increments the PPA in the input block table 62, such that the updated PPA equals to the previous PPA plus written data size. When the PPA exceeds maximum page address of the input block 40, the controller 14 remaps the input block 40 as an active block 41 for logical access in the active block pool 410.

Similarly when the controller 14 carries out a write operation of data to an input block 42 for physical access, the controller 14 specifies a PPA by referring to the input block table 64 for physical access, writes the data to the specified page address in the input block 42, and increments the PPA in the input block table 64, such that the updated PPA equals to the previous PPA plus written data size. When the PPA exceeds maximum page address of the input block 42, the controller 14 remaps the input block 42 as an active block 43 for physical access in the active block pool 430.

[Storage Device]

Figure 13:
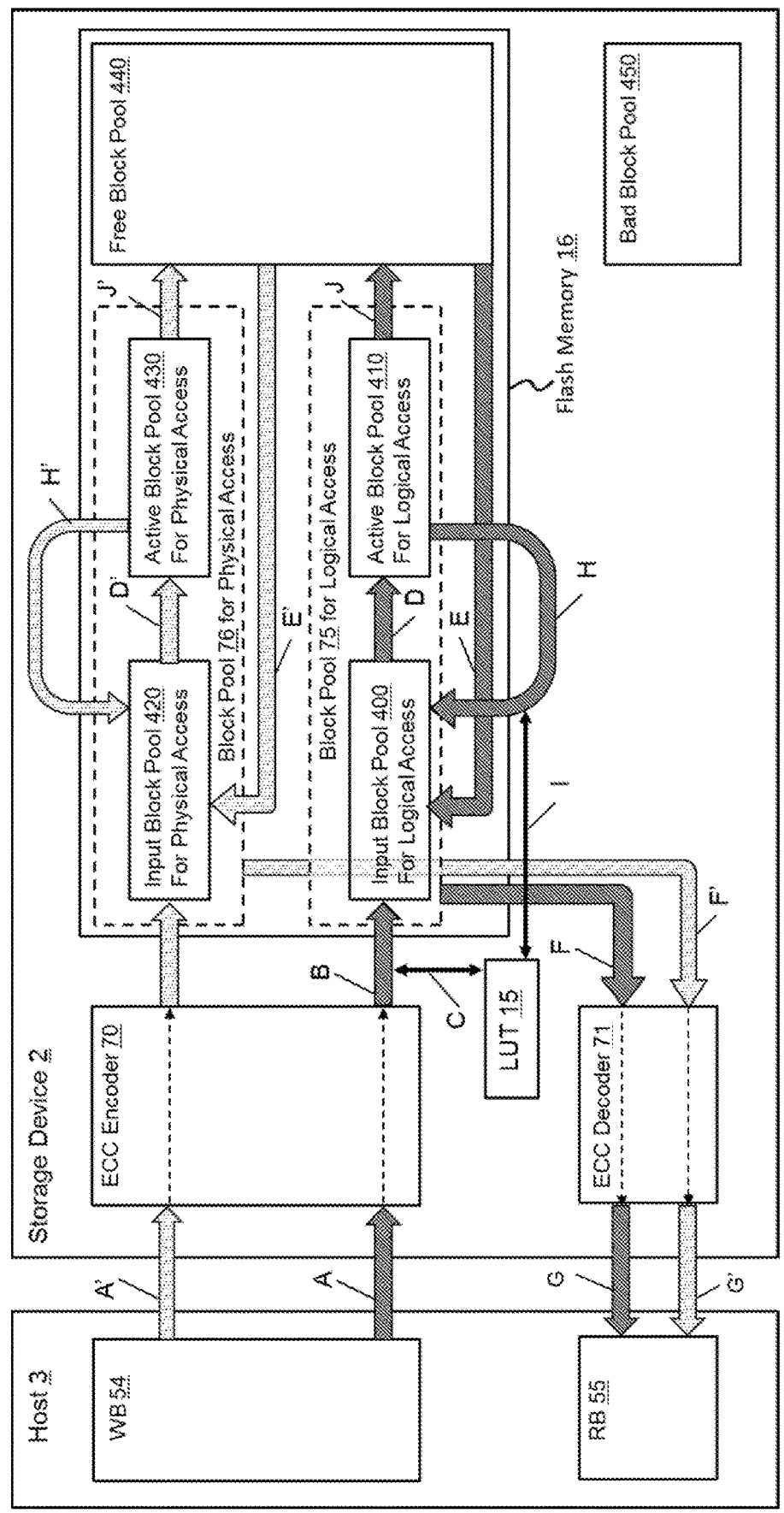
FIG. 13 illustrates an architecture overview of data flow and block mapping in the storage system according to the embodiment.

FIG. 13 illustrates an architecture overview of data flow and block mapping in the storage system 1. As described above, the communication procedures between the host 3 and the storage device 2 includes two procedures: the logical access and the physical access. Further, the host 3 can communicate with the storage device 2 by carrying out the logical access and the physical access in parallel, and the storage device 2 can perform a logical operation (e.g., a logical write operation (See FIG. 14)) and a physical operation (e.g., a physical read operation (See FIG. 18)) in parallel.

During the logical access (arrows of hatched lines in FIG. 13), the host 3 uses the logical write command 81 to write data into the storage device 2, uses the logical read command 80 to read data from the storage device 2, and uses the LBA 53 to designate a location of the flash memory 16 into which the data are to be written or from which data are to be read (See FIG. 3). When the host 3 writes data (write data) into an LBA 53 of storage device 2 using the logical write command 81, the host 3 transmits the write data from the write buffer (WB) 54 to an ECC encoder 70 in the controller 14 of the storage device 2 (arrow A in FIG. 13). Then, the ECC encoder 70 generates an error correction code of the write data, and the controller 14 writes the write data and the error correction code into an input block 40 in the input block pool 400 for logical access (arrow B in FIG. 13). At this time, the controller 14 also updates the LUT 15 to remap the LBA 53 to a physical address 56 of the input block 40 into which the write data are written (arrow C in FIG. 13).

When the input block 40 becomes full, the controller 14 updates the BMT 46 to remap the input block 40 as an active block 41 in the active block pool 410 for logical access (arrow D in FIG. 13) and also updates the BMT 46 to remap a free block 44 in the free block pool 440 as a new input block 40 (arrow E in FIG. 13). When data stored in an LBA 53 are overwritten through a logical write command 81 or an LBA 53 is de-allocated by a trim command 82, the controller 14 updates the LUT 15 to invalidate mappings from the LBA 53 to the corresponding physical address 56.

When the host 3 reads data from an LBA 53 of the flash memory 16 through the logical read command 80, the controller 14 translates the LBA 53 to the corresponding physical addresses 56 by referring to the LUT 15, reads data from the physical addresses 56 of the flash memory 16, and transmits the read data to a ECC decoder 71 of the controller 14 (arrow F in FIG. 13). The ECC decoder 71 carries out an error correction on the read data, and the read data (subjected to the error correction) are transmitted to the read buffer (RB) 55 of the host 3 (arrow G in FIG. 13). During the logical access, data are read from physical blocks within a block pool 75 for logical access (the input block 40 for logical access and active blocks 41 for logical access).

During the physical access (dotted arrows in FIG. 13), the host 3 uses the physical write command 91 to write data into the storage device 2, uses the physical read command 90 to read data from the storage device 2 (See FIG. 3). Also, the physical address 56 is used by the storage device 2 to indicate a location of the flash memory 16 into which the data are written and used by the host 3 to designate a location of the flash memory 16 from which data are read (See FIG. 3). When the host 3 writes data (write data) into a physical address 56 of the flash memory 16 using the physical write command 91, the host 3 transmits the write data from the WB 54 to the ECC encoder 70 (arrow A' in FIG. 13). Then, the ECC encoder 70 generates an error correction code of the write data and the controller 14 writes the write data and the error correction code into an input block 42 in the input block pool 420 for physical access (arrow B' in FIG. 13). At this time, the controller 14 does not update the LUT 15, because no LBA is involved in the communication between the host 3 and the storage device 2. Instead, the controller 14 notifies the host 3 of the physical address 56 of the flash memory 16 into which the write data are written.

When the input block 42 becomes full, the controller 14 updates the BMT 46 to remap the input block 42 as an active block 43 in the active block pool 430 for physical access (arrow D' in FIG. 13) and also updates BMT 46 to remap a free block 44 in the free block pool 440 as a new input block 42 (arrow E' in FIG. 13). In the physical access, data stored in a physical address 56 are not overwritten before the data in the physical address 56 are invalidated in accordance with the invalidate command 92 and the invalidate command 92 is a command to invalidate an entire physical block. When the host 3 transmits an invalidate command 92 to the storage device 2 to invalidate a physical block in the input block pool 420 and the active block pool 430, the controller 14 updates the BMT 46 to remap the physical block as a free block 44 in the physical block pool 440.

When the host 3 reads data from a physical address 56 of the flash memory 16 through the physical read command 90, the controller 14 reads data from the physical addresses 56, which is designated in the physical read command 90, without referring to the LUT 15, and transmits the read data to the ECC decoder 71 of the controller 14 (arrow F' in FIG. 13). The ECC decoder 71 carries out an error correction on the read data, and the read data (subjected to the error correction) are transmitted to the read buffer (RB) 55 of the host 3 (arrow G' in FIG. 13). During the physical access, data can be read from physical blocks within a block pool 76 for physical access (the input block 42 for physical access and active blocks 43 for physical access) and from physical blocks within the block pool 75 for logical access (the input block 40 for logical access and active blocks 41 for logical access).

When there is not enough amount of free blocks 44 in the free block pool 440 both during the logical access and the physical access, the controller 14 transmits a notification to the host 3 to notify that there is not enough amount of free blocks 44 in the flash memory 16.

In this situation, if the host 3 transmits the host-initiated garbage collection (HIGC) command 83 to the storage device 2, the controller 14 performs logical garbage collection. Also, the controller 14 may determine on its own to carry out logical garbage collection. Logical garbage collection is carried out on the active block pool 410 for logical access by moving data from one or more active blocks 41 having the larger amount of invalid data to the input block(s) 40 for logical access (arrow H in FIG. 13). Also, the controller 14 updates the LUT 15 to remap LBAs 53 of the moved data to physical addresses 56 of the input block 40 to which the data are moved (copied) (arrow I in FIG. 13), and also updates the BMT 46 to remaps the active blocks 41 from which the data are moved (copied) as free blocks 44 (arrow J in FIG. 13).

On the other hand, the controller 14 carries out physical garbage collection on the active block pool 430 for physical access in response to the copy command 93 by moving data from one or more active blocks 43 having the larger amount of invalid data (as determined by the host 3) to the input block(s) 42 for physical access that have sufficient space (arrow H' in FIG. 13). Also, in response to an invalidate command 92, the controller 14 updates the BMT 46 to remaps the active blocks 43 from which the data are moved (copied) as free blocks 44 (arrow J' in FIG. 13).

Hereinafter, a number of operations carried out during the logical access and a number of operations carried out during the physical access are described.

[Logical Write Operation]

Figure 14:
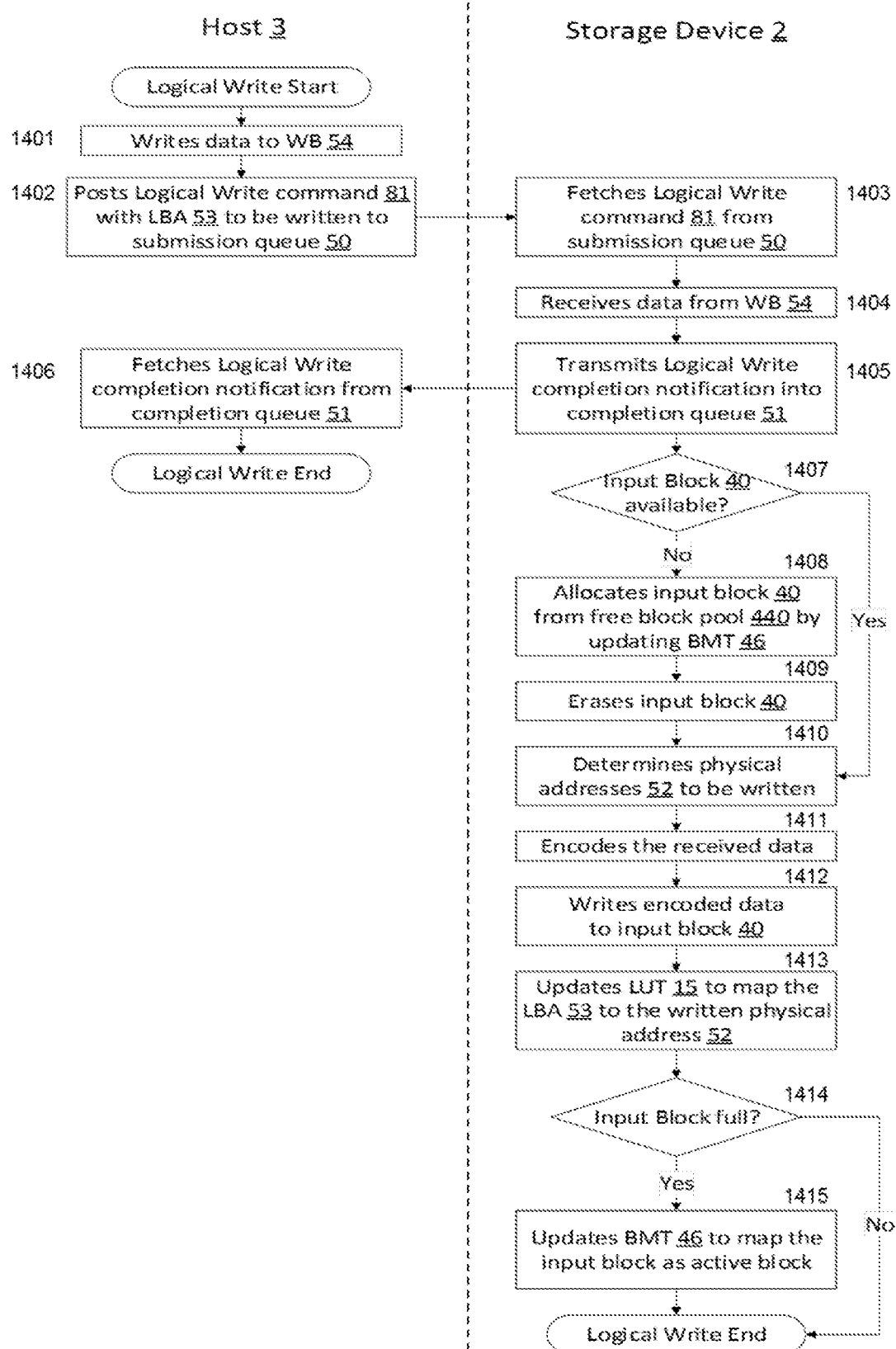
FIG. 14 illustrates a flow of a logical write operation carried out when the host performs logical access.

FIG. 14 illustrates a flow of a logical write operation carried out when the host 3 performs the logical access. When the logical write operation starts, in step 1401, the host 3 writes data to be written into the flash memory 16 of the storage device 2 (write data) into the write buffer (WB) 54 of the host 3. Then, in step 1402, the host 3 posts a logical write command 81, which includes an LBA 53 of the flash memory 16 in which the write data are to be written, to the submission queue 50 of the host 3.

In step 1403, the controller 14 of the storage device 2 fetches the logical write command 81 from the submission queue 50. Then, in step 1404, the controller 14 receives the write data from the WB 54. Upon reception of the write data, in step 1405, the controller 14 transmits a logical write completion notification to the host 3, so that the logical write completion notification is posted on the completion queue 51 of the host 3. In step 1406, the host 3 fetches the logical write completion notification from the completion queue 51 and the process on the side of the host 3 ends.

In step 1407, the controller 14 of the storage device 2 determines whether or not an input block 40 for logical access is available for data writing. If the determination is positive (Yes in step 1407), the process proceeds to step 1410. If the determination is negative (No in step 1407), the process proceeds to step 1408. In step 1408, the controller 14 remaps a free block 44 in the free block pool 440 as a new input block 40 for logical access, by updating the BMT 46. Then, in step 1409, the controller 14 erases data in the new input block 40.

In step 1410, the controller 14 determines a physical address 56 of the input block 40 in which the write data are to be written. Then, in step 1411, the ECC encoder 70 of the controller 14 generates an error correction code based on the write data. In step 1412, the controller 14 writes the write data and the error correction code into the determined physical address of the input block 40. In step 1413, the controller 14 stores correspondence between the LBA 53 and the determined physical address 56 in the LUT 15.

In step 1414, the controller 14 determines whether or not the input block 40 becomes full while writing the write data. If the determination is negative (No in step 1414), the process for the logical write operation ends. If the determination is positive (Yes in step 1414), the process proceeds to step 1415. In step 1415, the controller 14 remaps the full input block 40 as an active block 41 for logical access, by updating the BMT 46, and the process for the logical write operation ends.

As described above, during the logical write operation, the host 3 transmits an LBA 53 to the storage device 2, and the storage device 2 determines a physical address 56 into which data are written and stores the correspondence between the LBA 53 and the physical address 56 in the LUT 15.

[Physical Write Operation]

Figure 15:
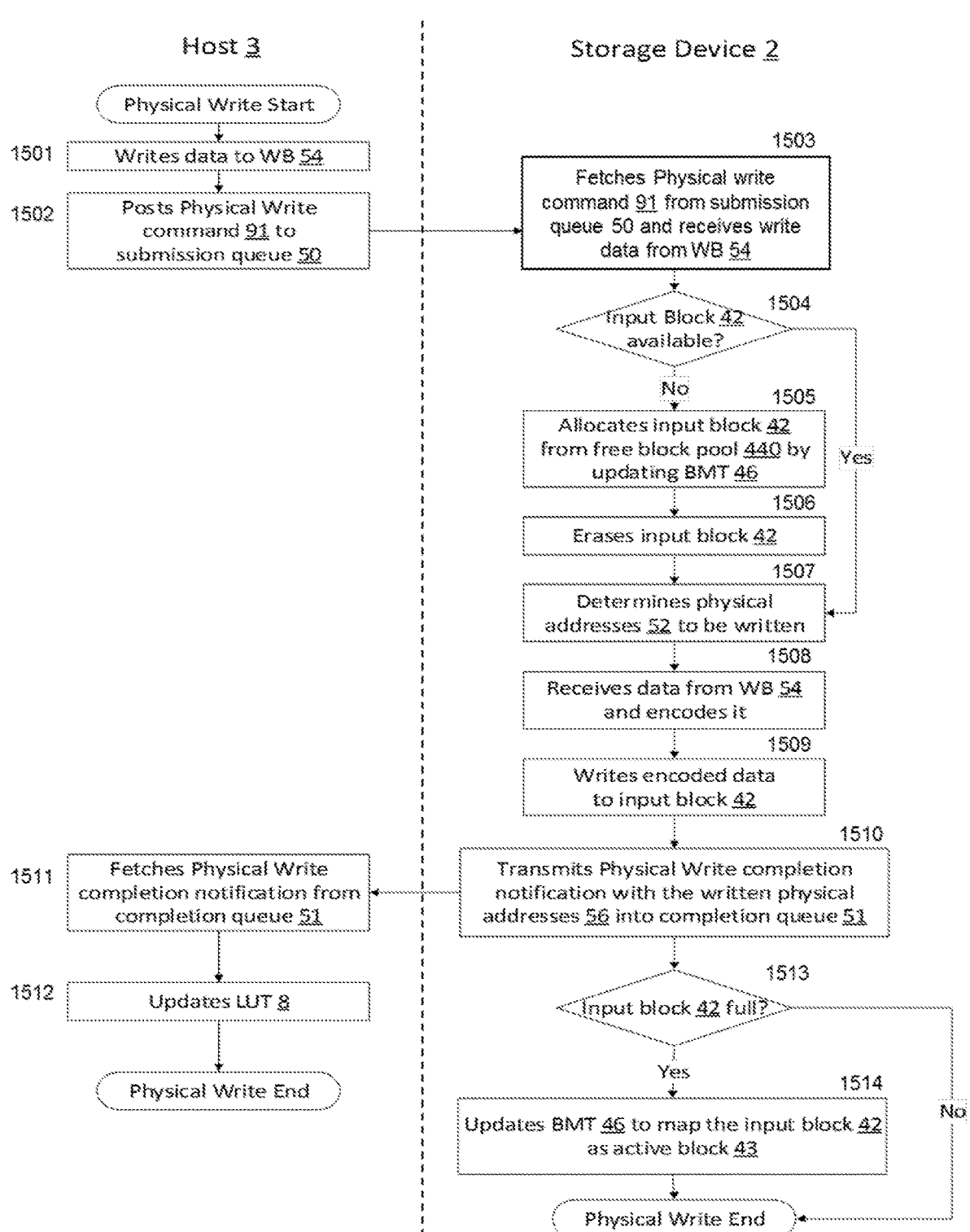
FIG. 15 illustrates a flow of a physical write operation carried out when the host performs physical access.

FIG. 15 illustrates a flow of a physical write operation carried out when the host 3 performs the physical access. When the physical write operation starts, in step 1501, the host 3 writes data to be written into the flash memory 16 of the storage device 2 (write data) into the write buffer (WB) 54 of the host 3. Then, in step 1502, the host 3 posts a physical write command 91, which does include no address information except for size information, to the submission queue 50 of the host 3.

In step 1503, the controller 14 of the storage device 2 fetches the physical write command 91 from the submission queue 50 and receives the write data from the WB 54. Upon reception of the write data, the controller 14 carries out steps 1504-1509 in a similar manner as steps 1407-1412 in FIG. 14. Here, the write data are written into the input block 42 for physical access, instead of the input block 40 for logical access.

Upon writing of the write data in the input block 42, in step 1510, the controller 14 transmits a physical write completion notification, which includes the physical address 56 into which the write data are written, to the host 3, so that the physical write completion notification is posted on the completion queue 51 of the host 3. In step 1511, the host 3 fetches the physical write completion notification from the completion queue 51. Then in step 1512, the host 3 updates the LUT 8 stored in the memory 5 of the host 3, so that mapping between Object ID of the write data and the physical address 56 of the input block 42 are stored therein. Thereafter, the process of the physical write operation on the side of the host 3 ends.

Further, on the side of the storage device 2, steps 1513-1514 are carried out in a similar manner as steps 1414-1415 in FIG. 14. Here, the input block 42 for physical access is remapped as the active block 43 for physical access, instead of remapping of the input block 40 for logical access as the active block 41 for logical access.

As described above, in the physical write operation, the host 3 does not send any address information to the storage device 2, and the controller 14 of the storage device 2 determines a physical address in which write data are written. Since the controller 14 determines a physical address of the input block 42 for physical access as the destination of the write data, the controller 14 can ensure that data written in the logical access and data written in the physical access are separately stored.

Further, because an invalidate operation (See FIG. 20) and a copy operation (See FIG. 21), which are carried out during the physical access, are carried out with respect to the block pool 76 for physical access, data written during the logical access are protected from data deletion through these operations. Similarly, because a trim operation (See FIG. 19) and logical garbage collection (See FIGS. 22-23), which are carried out during the logical access, are carried out with respect to the block pool 75 for logical access, data stored in the physical access are protected from data deletion through these operations.

[Hybrid Write Operation]

Figure 16:
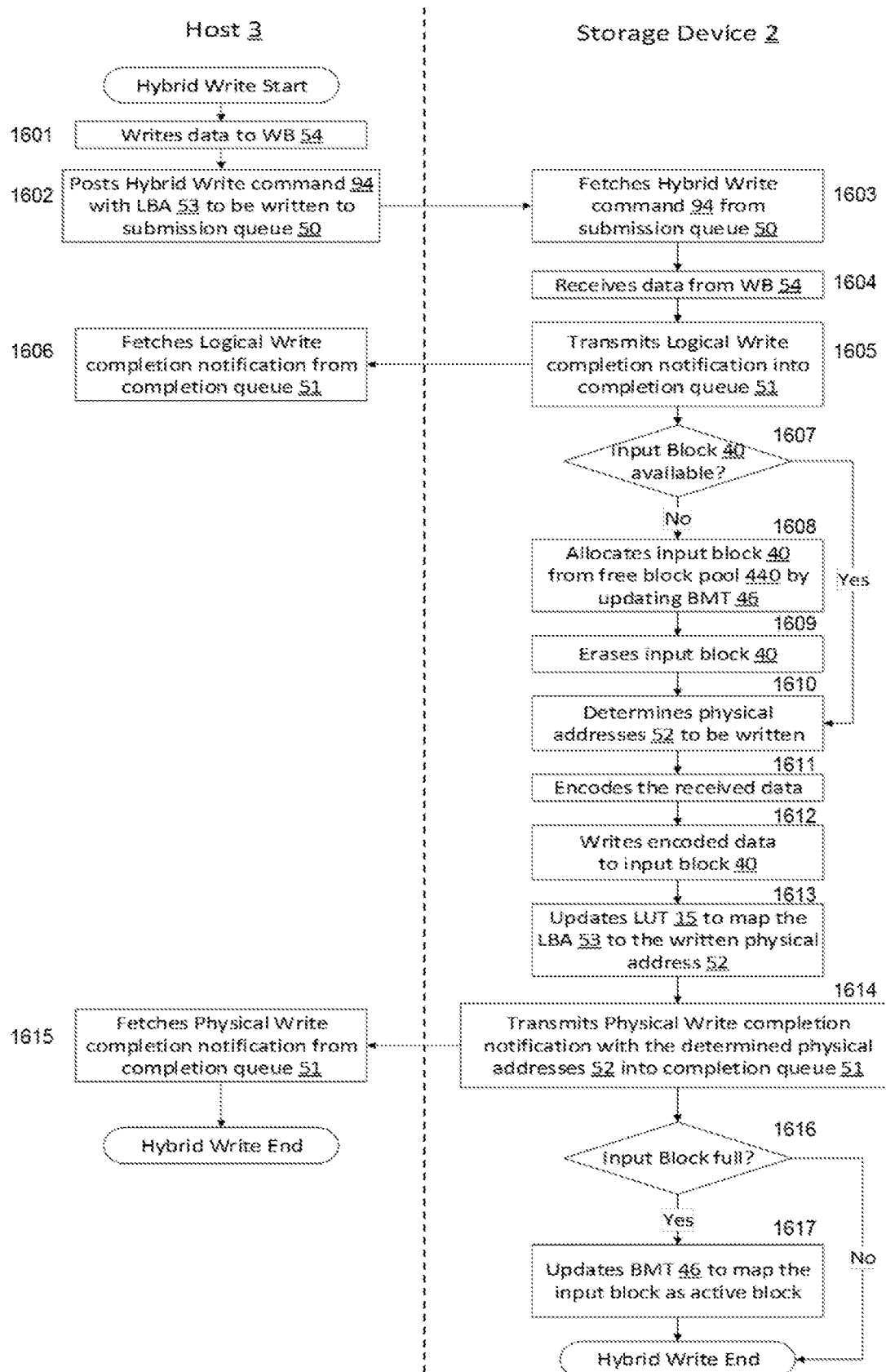
FIG. 16 illustrates a flow of a hybrid write operation that are carried out when the host performs both the logical access and the physical access.

FIG. 16 illustrates a flow of a hybrid write operation that is carried out during the logical access. This hybrid write operation is suitably carried out when the host 3 can perform both the logical access and the physical access. Through the hybrid write operation, the host 3 sends an LBA 53 to the storage device 2 and receives a physical address 56 corresponding to the LBA 53 from the storage device 2, so that the host 3 can read the data through a physical read operation in the future (See FIG. 18). Steps 1601-1613 and 1616-1617 in the hybrid write operation are carried out in a similar manner as steps 1401-1415 carried out in the logical write operation. However, in the hybrid write operation, the host 3 posts the hybrid write command 94 instead of the logical write command 81. Also, steps 1614-1615 are further carried out in the hybrid write operation in a similar manner as steps 1510-1511 carried out in the physical write operation.

According to the hybrid write operation, while the host 3 sends an LBA 53 in which write data are to be written, the host 3 receives the corresponding physical address 56. Since the host 3 knows the location of the data stored in the storage device 2 through the hybrid write operation by both the LBA 53 and the physical address 56, the host 3 can read the data through both a logical read operation (See FIG. 17) and a physical read operation (See FIG. 18). Particularly when a faster access is required and the host 3 can switch operational modes between a logical access mode and a physical access mode, the host 3 can select the physical access mode and carry out the physical read operation. Since no translation of an LBA to a physical address is involved in the physical read operation, faster data reading can be achieved.

Further, according to the hybrid write operation, the host 3 can receive the logical write completion notification in step 1606 before write data are actually written into the flash memory 16 in step 1611, and receive the physical write completion notification including the physical address 56 later in step 1614. According to such process, the host 3 can know the physical address 56 in which date are written, while latency of the write operation is reduced.

[Logical Read Operation]

Figure 17:
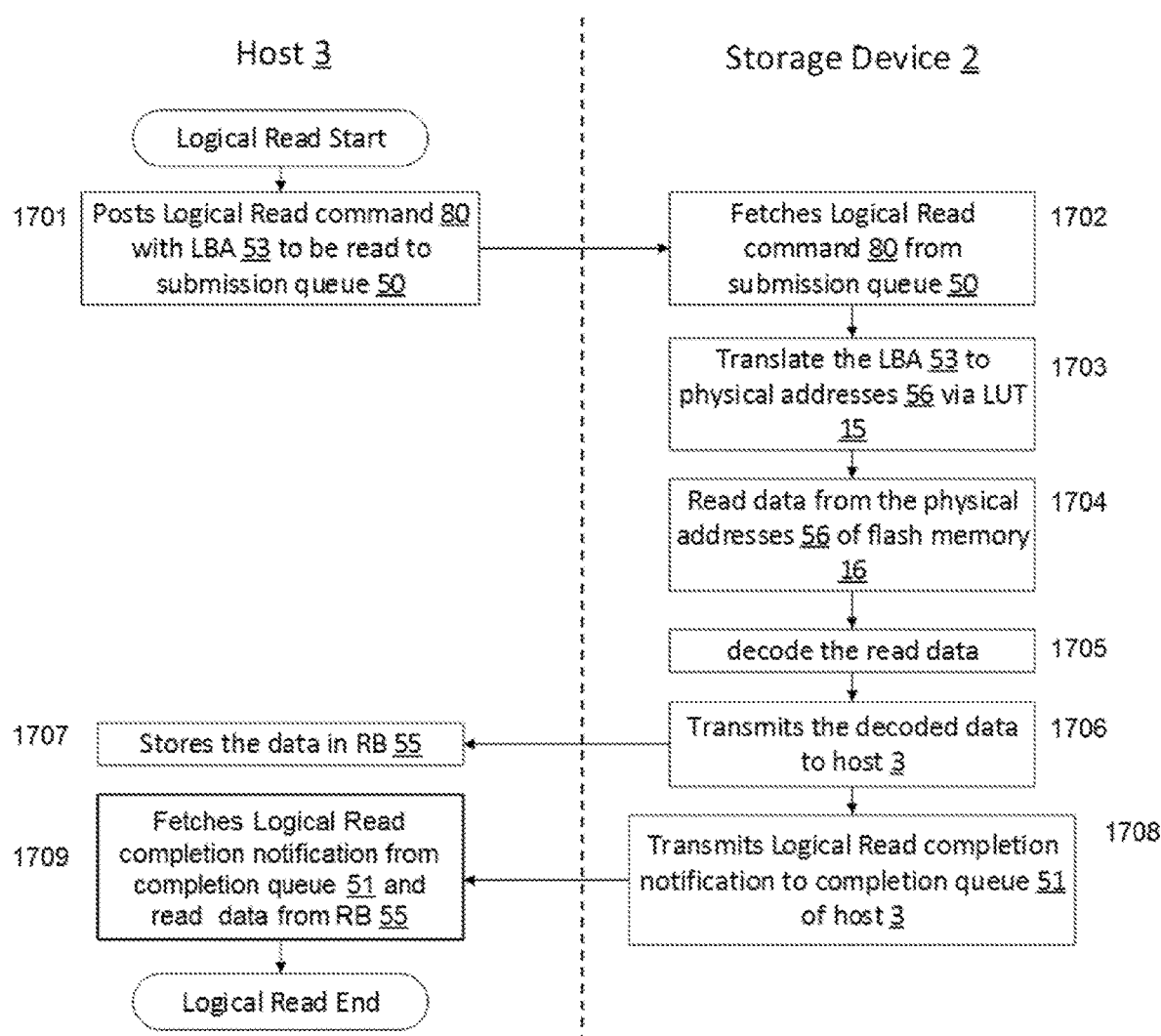
FIG. 17 illustrates a flow of a logical read operation carried out when the host performs the logical access.

FIG. 17 illustrates a flow of a logical read operation carried out when the host 3 performs the logical access. Through the logical read operation, data written through the logical write operation and data written through the hybrid write operation can be read. When the logical read operation starts, in step 1701, the host 3 posts a logical read command 80, which includes an LBA 53 from which data are to be read, to the submission queue 50.

In step 1702, the controller 14 of the storage device 2 fetches the logical read command 80 from the submission queue 50. Then, in step 1703, the controller 14 translates the LBA 53 included in the logical read command 80 to a physical address 56 by referring to the LUT 15. In step 1704, the controller 14 reads data from the physical address 56 of the flash memory 16. Here, a physical block corresponding to the physical address 56 is mapped within the block pool 75 for logical access (i.e., the input block 40 or one of the active block 41), because only mapping between LBAs and physical blocks within the block pool 75 for logical access are stored in the LUT 15.

In step 1705, the ECC decoder 71 of the controller 14 decodes the read data and carries out error correction if an error is detected in the read data. Then, in step 1706, the controller 14 transmits the decoded read data (error-corrected data, if any) to the host 3. Upon receiving the read data, in step 1707, the host 3 stores the read data in the read buffer 55. Further, in step 1708, the controller 14 transmits a logical read completion notification to the host 3, so that the logical read completion notification is posted on the completion queue 51 of the host 3. In step 1709, the host 3 fetches the logical read completion notification from the completion queue 51, and the process of the logical read operation ends.

[Physical Read Operation]

Figure 18:
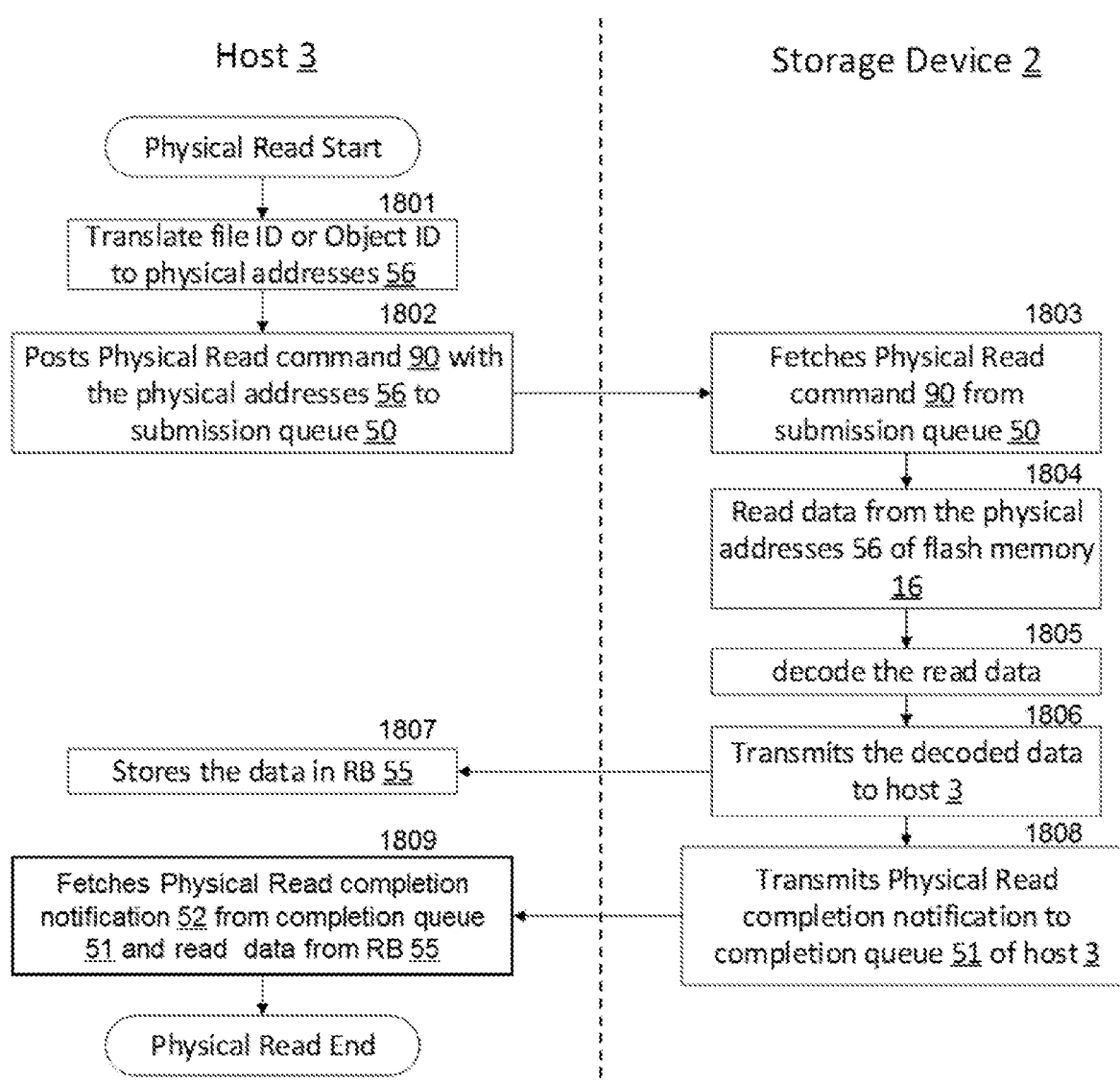
FIG. 18 illustrates a flow of a physical read operation carried out when the host performs the logical access.

FIG. 18 illustrates a flow of a physical read operation carried out when the host 3 performs the physical access. Through the physical read operation, data written through the physical write operation and data written through the hybrid write operation can be read. When the physical read operation starts, in step 1801, the host 3 translates a file ID or an object ID of data to be read to one or more physical addresses 56 from which data are to be read, by referring to the LUT 8. Then, in step 1802, the controller 14 posts a physical read command 90, which includes the physical addresses 56, to the submission queue 50.

In step 1803, the controller 14 of the storage device 2 fetches the physical read command 90 from the submission queue 50. Then, in step 1804, the controller 14 reads data from the physical addresses 56 of the flash memory 16. Here, a physical block corresponding to the physical addresses 56 may be mapped within the block pool 76 for physical access (i.e., the input block 42 or one of the active block 43) or within the block pool 75 for logical access (i.e., the input block 40 or one of the active block 41), because physical addresses are directly transmitted from the host 3 and there is no need to refer to the LUT 15 for translation of address.

In step 1805, the ECC decoder 71 of the controller 14 decodes the read data and carries out error correction if an error is detected in the read data. Then, in step 1806, the controller 14 transmits the decoded read data (error-corrected data, if any) to the host 3. Upon receiving the read data, in step 1807, the host 3 stores the read data in the read buffer 55. Further, in step 1808, the controller 14 transmits a physical read completion notification to the host 3, so that the physical read completion notification is posted on the completion queue 51 of the host 3. In step 1709, the host 3 fetches the physical read completion notification from the completion queue 51, and the read data from the read buffer 55, and the process of the physical read operation ends.

[Trim Operation]

Figure 19:
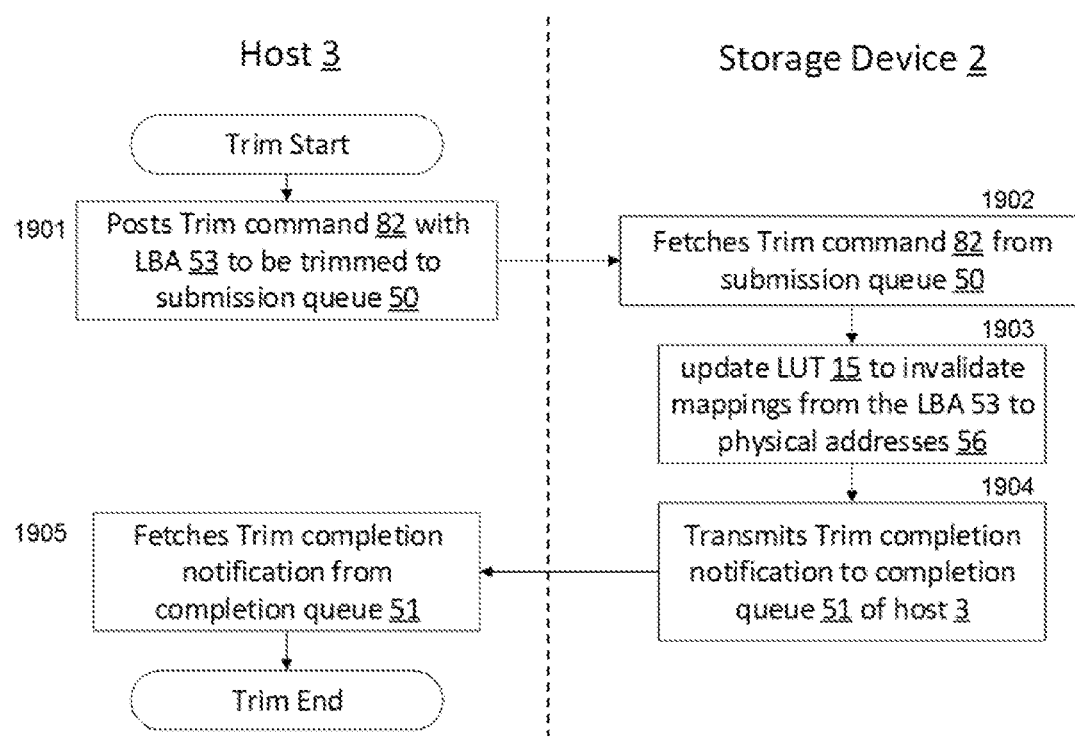
FIG. 19 illustrates a flow of a trim operation carried out when the host performs the logical access.

FIG. 19 illustrates a flow of a trim operation carried out when the host 3 performs the logical access. Through the trim operation, mapping of an LBA to a physical address 56 in the LUT 15 of the storage device 2 is trimmed (invalidated). Once the trim operation is carried out, a logical read operation designating the trimmed LBA cannot be successfully carried out.

When the trim operation starts, in step 1901, the host 3 posts a trim command 82, which includes an LBA 53 to be trimmed, to the submission queue 50. In step 1902, the controller 14 of the storage device 2 fetches the trim command 82 from the submission queue 50. Then, in step 1903, the controller 14 invalidates the mapping from the LBA 53 to be trimmed to a physical address 56, by updating the LUT 15. In step 1904, the controller 14 transmits a trim completion notification to the host 3, so that the trim completion notification is posted on the completion queue 51 of the host 3. In step 1905, the host 3 fetches the trim completion notification from the completion queue 51, and the process of the trim operation ends.

[Invalidate Operation]

Figure 20:
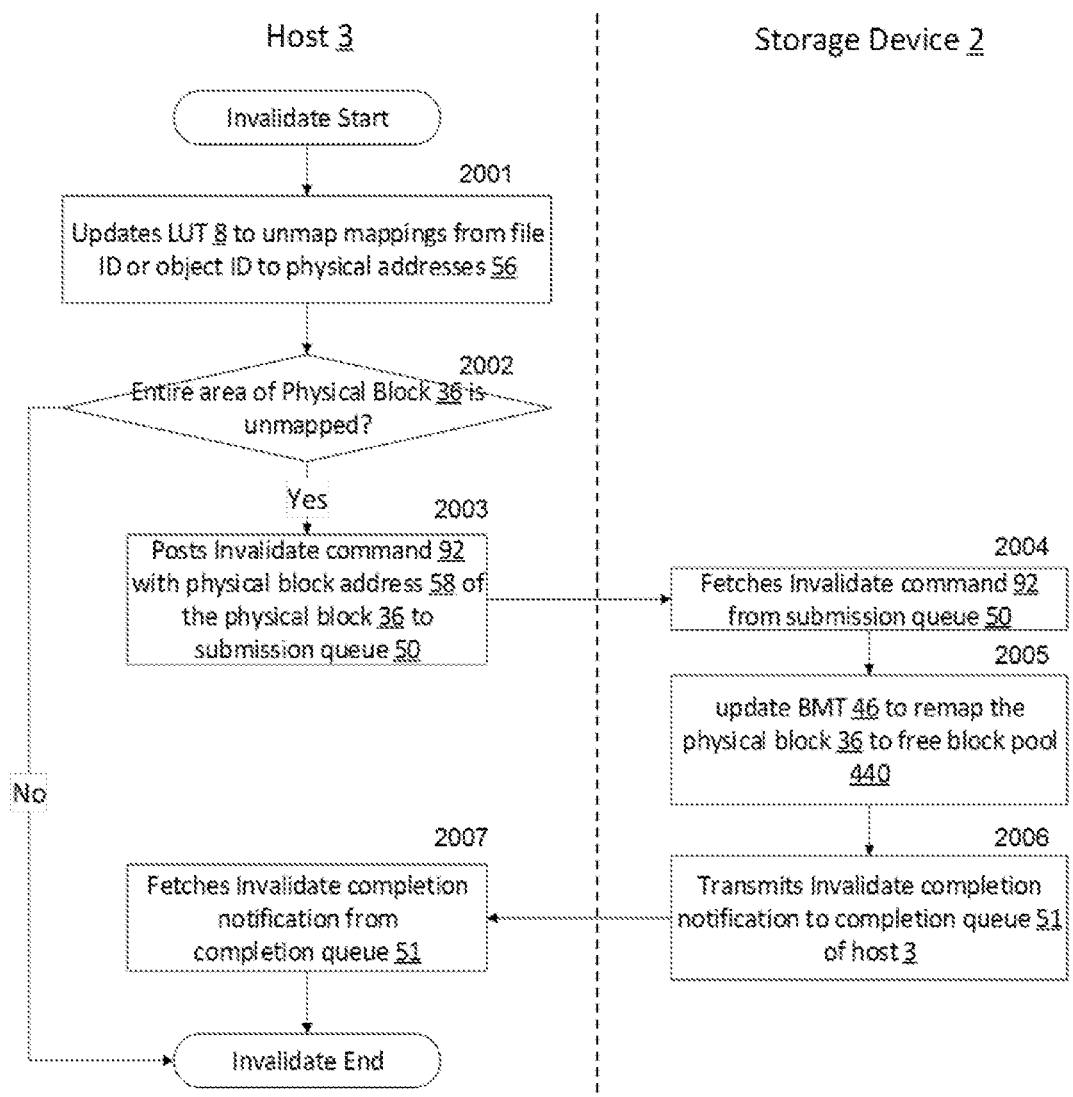
FIG. 20 illustrates a flow of an invalidate operation carried out when the host performs the physical access.

FIG. 20 illustrates a flow of an invalidate operation carried out when the host 3 performs the physical access. Through the invalidate operation, mapping in the LUT 8 from a file ID or an object ID of data to a physical address 56 of the flash memory 16 in which the data are stored are deleted, and further a physical block corresponding to the physical address are remapped as a free block in the BMT 46.

When the invalidate operation starts, in step 2001, the host 3 unmaps (deletes) mapping from a file ID of an object ID of data to be invalidated to its corresponding physical addresses 56, by updating the LUT 8. Then, in step 2002, the host 3 determines whether or not the physical addresses 56 range an entire region (pages) of a physical block (an input block 42 (40) or an active block 43 (41)). If the determination is negative (No in step 2002), the process of the invalidate operation ends. If the determination is positive (Yes in step 2002), the process proceeds to step 2003.

In step 2003, the host 3 posts an invalidate command 92, which includes the physical addresses 56 corresponding the physical block, to the submission queue 50. In step 2004, the controller 14 of the storage device 2 fetches the invalidate command 92 from the submission queue 50. Then, in step 2005, the controller 14 remaps the physical block as a free block 44 by updating the BMT 56. By remapping of the physical block as a free block, data therein are invalidated. In some embodiments, if the physical block targeted for the invalidation is mapped in the block pool 75 for logical access, the controller 14 may return an error as a response to the invalidate command, so that the controller 14 can protect data which were written in accordance with a logical write command from being deleted by executing the invalidate command.

In step 2006, the controller 14 transmits an invalidate completion notification to the host 3, so that the invalidate completion notification is posted on the completion queue 51 of the host 3. In step 2007, the host 3 fetches the invalidate completion notification from the completion queue 51, and the process of the invalidate operation ends.

According to the invalidate operation, if the physical addresses to be invalidated range an entire physical block, the physical block is remapped as a free block 44, which effectively invalidates all data therein.

[Copy Operation]

Figure 21:
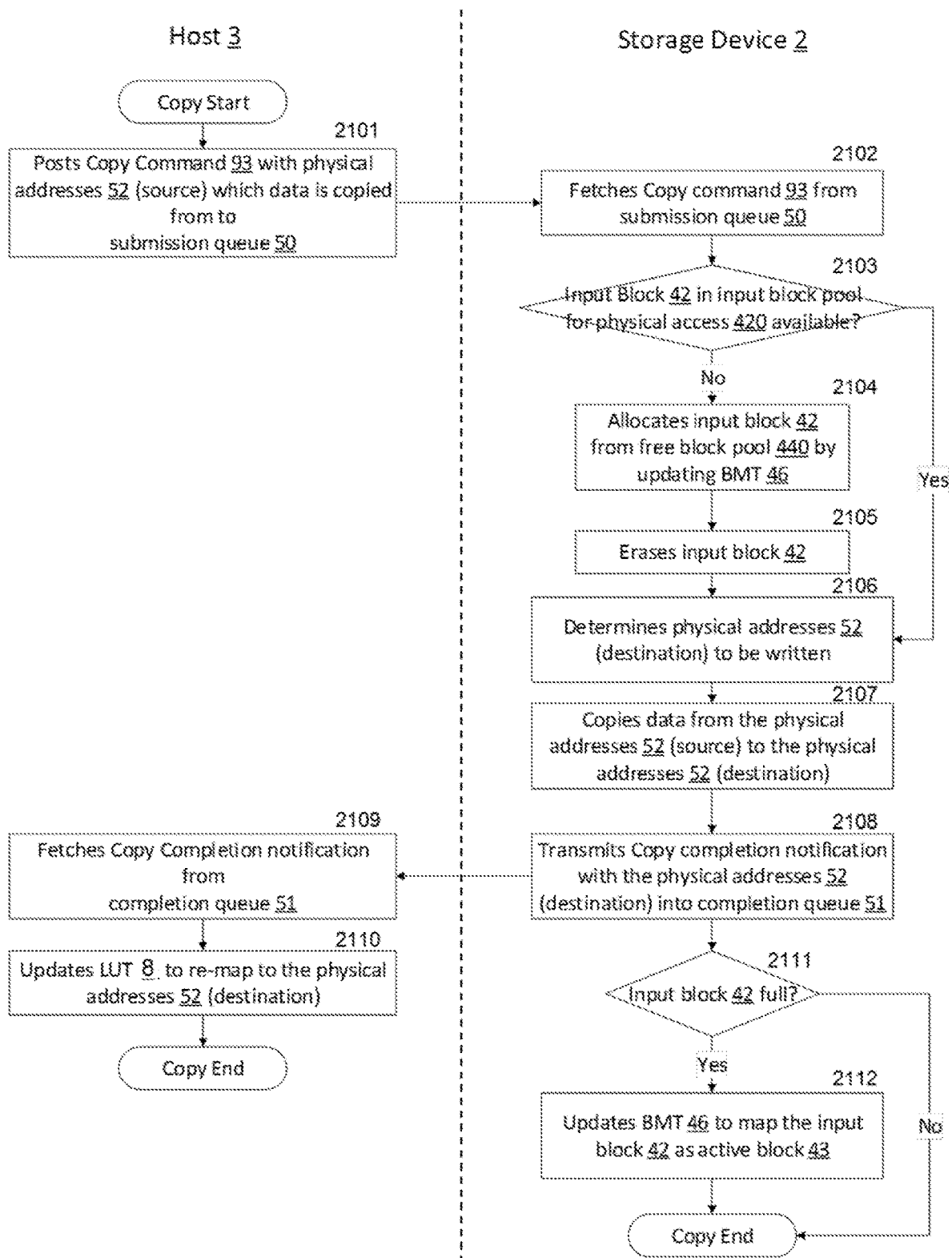
FIG. 21 illustrates a flow of a copy operation carried out when the host performs the physical access.

FIG. 21 illustrates a flow of a copy operation carried out when the host 3 performs the physical access. Through the copy operation, data stored in a physical address of the flash memory 16 are transferred to another physical address in the same physical block or another physical block. When the copy operation starts, in step 2101, the host 3 posts a copy command 93, which includes a physical address 56 from which data are to be copied, to the submission queue 50.

In step 2102, the controller 14 of the storage device 2 fetches the copy command 93 from the submission queue 50. Thereafter, step 2103-2112 are carried out in a similar manner as steps 1504-1514. In detail, a physical address determined in step 2106 (destination physical address) is for writing (i.e., copying) data from the physical address 56 included in the copy command 93 (source physical address). In step 2107, data are copied from the source physical address to the destination physical address. In step 2108, a copy completion notification, including the destination physical address, is transmitted instead of the physical write completion notification transmitted in step 1510 in the physical write operation.

[Garbage Collection Operation]

In the present embodiment, as shown in FIG. 13, both active blocks 41 for logical access and active blocks 43 for physical access may be remapped as the free blocks 44, and a free block 44 in the free block pool 440 may be remapped as an input block 40 for logical access or an input block 42 for physical access. That is, the free blocks 44 may be used both during the logical access and the physical access. To increase the number of free blocks 44 for future data writing and other data processing, garbage collection is carried out. Garbage collection may be initiated by determination of the storage device 2 (device-initiated garbage collection (DIGC)) or by a command (e.g., host-initiated garbage collection or HIGC command 83) from the host 3. In addition, when garbage collection is initiated by the command from the host 3, the garbage collection may be carried out through the logical access (logical garbage collection) and/or the physical access (physical garbage collection).

(Device-Initiated Garbage Collection (DICG))

Figure 22:
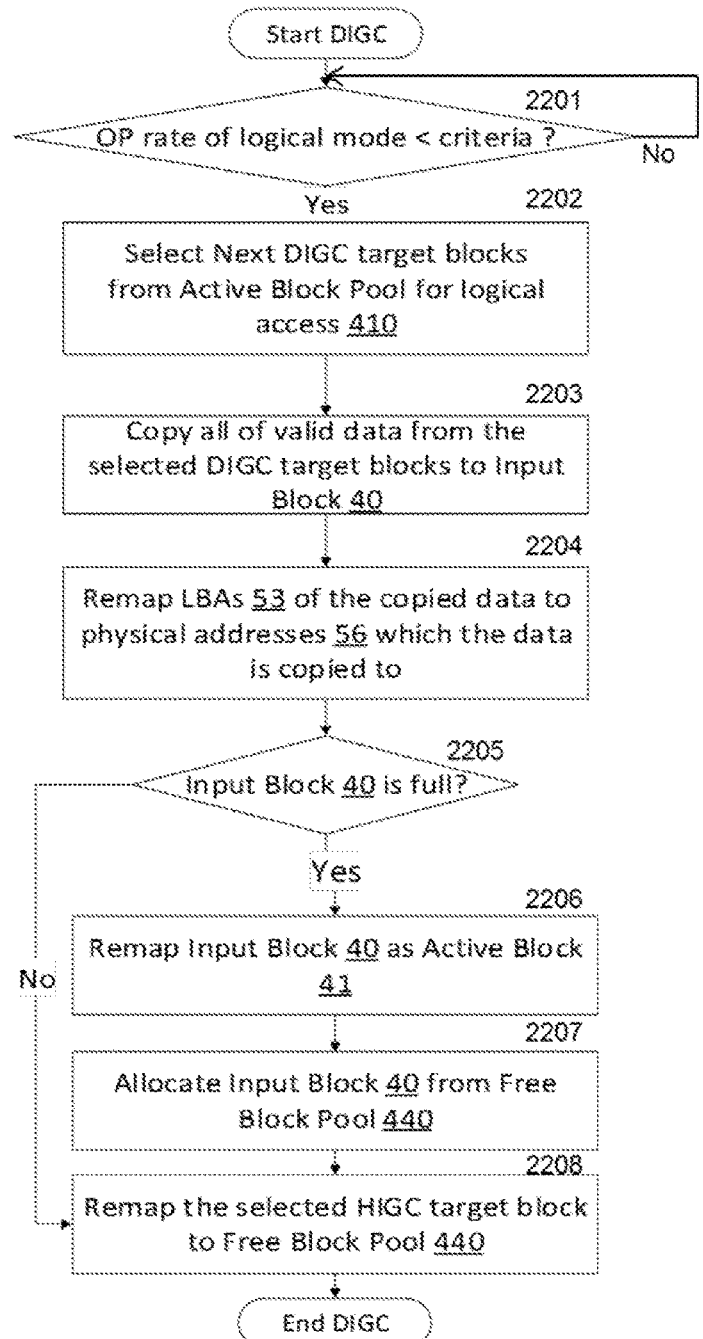
FIG. 22 illustrates a flow of a device-initiated garbage collection (DIGC).

FIG. 22 illustrates a flow of the device-initiated garbage collection (DIGC). To determine whether to initiate the device-initiated garbage collection, the controller 14 of the storage device 2 periodically monitors an overprovisioning ratio for logical access. That is, in step 2201, the controller 14 periodically determines whether or not the overprovisioning ratio for logical access is smaller than a predetermined value. Here, the overprovisioning ratio (OP ratio) for logical access is defined as a ratio of a total size of free blocks 44 in the free block pool 440 with respect to a total size of valid data stored in physical blocks within the block pool 75 for logical access (i.e., the input block 40 and active blocks 41 for logical access). The OP ratio dynamically changes as the storage device 2 operates. The predetermined value is set by the controller 14 of the storage device 2, but can be modified by the host 3. If the determination is negative (No in step 2201), step 2201 is carried out again after predetermined period of time. If the determination is positive (Yes in step 2202), the process proceeds to step 2202.

In step 2202, the controller 14 selects one or more active blocks 41 for logical access as target block(s) for garbage collection. Then, in step 2203, the controller 14 copies all valid data in the target block(s) and write the copied data in the input block 40 for logical access. In accordance with transfer of the copied data to new physical addresses, in step 2204, the controller 14 remaps the LBAs 53 of the copied data to the new physical addresses, by updating the LUT 15. Then, in step 2205, the controller 14 determines whether or not the input block 40 becomes full. If the determination is negative (No in step 2205), the process proceeds to step 2208. If the determination is positive (Yes in step 2205), the process proceeds to step 2206.

In step 2206, the controller 14 remaps the full input block 40 as an active block 41 by updating the BMT 46. In step 2207, the controller 14 remaps a free block 44 as a new input block 40 by updating the BMT 46. In step 2208, the controller 14 remaps the target block(s) as free block(s) 44, by updating the BMT 46, and the process of the device-initiated garbage collection ends. Here, the order of steps 2206-2208 can be arbitrarily changed.

(Logical Host-Initiated Garbage Collection)

Figure 23:
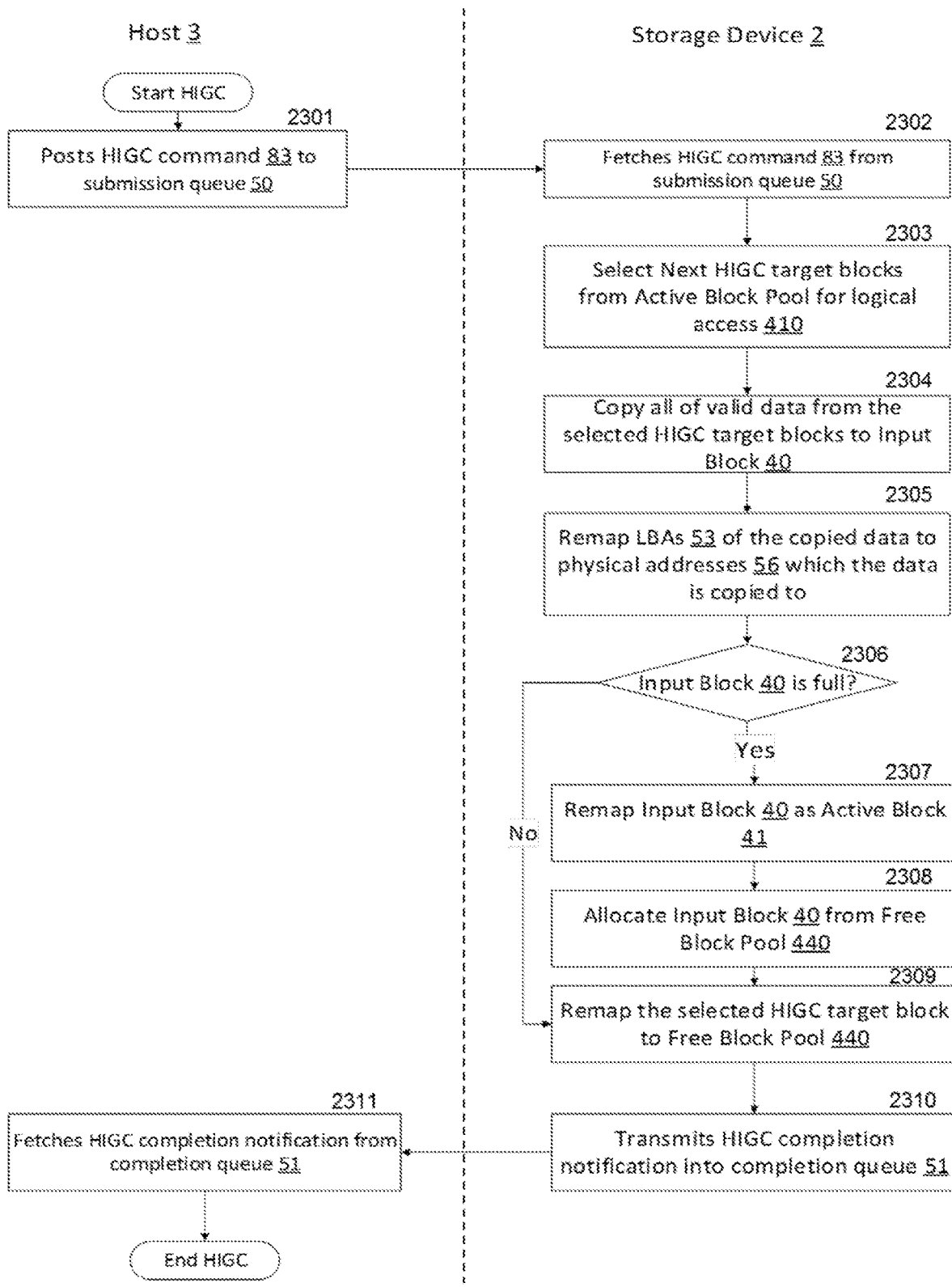
FIG. 23 illustrates a flow of a logical host-initiated garbage collection.

FIG. 23 illustrates a flow of the logical host-initiated garbage collection carried out when the host 3 performs the logical access. To determine whether to initiate the logical host-initiated garbage collection, the host 3 may periodically receive, from the storage device 2, the overprovisioning ratio for logical access. When the host 3 determines to carry out the logical host-initiated garbage collection, in step 2301, the host 3 posts a host-initiated garbage collection (HIGC) command 83 to the submission queue 50.

In step 2303, the controller 14 fetches the HIGC command 83 from the submission queue 50. Thereafter, steps 2303-2309 are carried out in a similar manner as steps 2202-2208 carried out in the device-initiated garbage collection. Then, in steps 2310, the controller 14 transmits a host-initiated garbage collection (HIGC) completion notification to the host 3, so that the HIGC completion notification is posted on the completion queue 51. In step 2311, the host 3 fetches the HIGC completion notification from the completion queue 51, and the logical host-initiated garbage collection ends.

(Physical Host-Initiated Garbage Collection)

Figure 24:
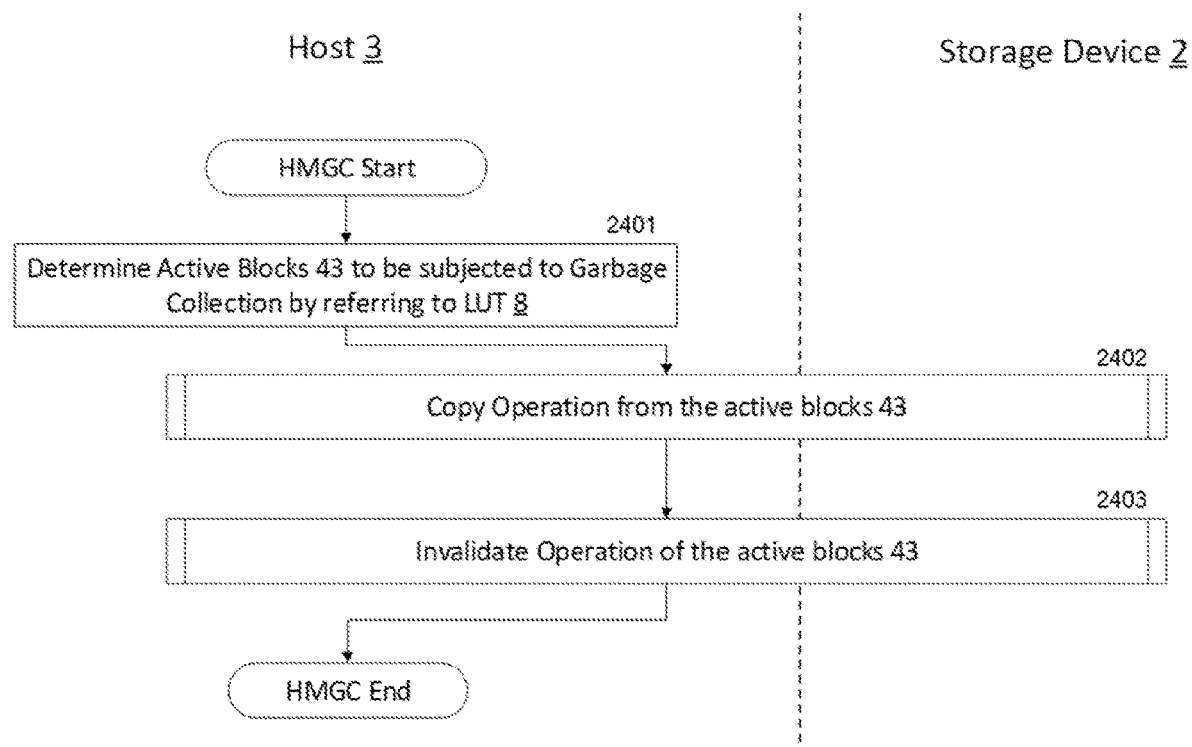
FIG. 24 illustrates a flow of a physical host-initiated garbage collection.

FIG. 24 illustrates a flow of the physical host-initiated garbage collection carried out when the host 3 performs the physical access. To determine whether to initiate the physical host-initiated garbage collection, the host 3 may periodically monitor an overprovisioning ratio for physical access, by referring to the LUT 8. Here, the overprovisioning ratio (OP ratio) for physical access is defined as a ratio of a total size of free blocks 44 in the free block pool 440 with respect to a total size of valid data stored in physical blocks within the block pool 76 for physical access (i.e., the input block 42 and active blocks 43 for physical access). When the host 3 determines to carry out the physical host-initiated garbage collection because, for example, the OP ratio for physical access is smaller than a predetermined value, in step 2401, the host 3 determines active blocks 43 to be subjected to garbage collection (target active blocks) by referring to LUT 8. Thereafter, in step 2402, the host 3 sends a copy command 93 to the storage device 2 to carry out a copy operation and updates LUT 8 in accordance with the flow shown in FIG. 21. Here, physical addresses of the target active blocks are determined as the source physical addresses. Then, in step 2403, the host 3 sends an invalidate command 92 to the storage device 2 to carry out an invalidate operation in accordance with the flow shown in FIG. 20, and the physical host-initiated garbage collection ends.

In the present embodiment, for example, when the OP ratio for logical access is small (smaller than a predetermined value) and the OP ratio for physical access is large (larger than a predetermined value), the host 3 may carry out only the logical host-initiated garbage collection, and not the physical host-initiated garbage collection. In contrast, for example, when the OP ratio for logical access is large (larger than a predetermined value) and the OP ratio for physical access is small (smaller than a predetermined value), the host 3 may carry out only the physical host-initiated garbage collection, and not the logical host-initiated garbage collection. Further, for example, when both the OP ratio for logical access and the OP ratio for physical access are small (smaller than a predetermined value), the host may carry out both the logical and physical host-initiated garbage collections.

As the foregoing illustrates, according to the above embodiments, the storage device 2 is operable both through the logical access and the physical access. When the storage device 2 is accessed through the logical access, the storage device 2 receives from the host 3 an LBA along with a command and manages mapping between LBAs and physical addresses of the flash memory 16 in the LUT 15. In contrast, when the storage device 2 is accessed through the physical access, the storage device 2 receives from the host 3 a physical address or no address along with a command and accesses the flash memory 16 without the mapping between LBAs and the physical addresses. The storage device 2 according to the above embodiment is compatible to all of a host that performs only the logical access, a host that performs only the physical access, and a host that performs both logical and physical accesses. When the host can perform both logical and physical accesses, by carrying out the hybrid write operation, data can be written through the logical process and read through the physical process.

Further, according to the above embodiment, by separating the input block and the active blocks for the logical access and those for the physical access, data written through the logical access and the physical access can be separately managed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile semiconductor memory;
   a memory;
   a first controller configured to receive commands from a host device including a write command with a logical address, which is of either a first type or a second type, and a write command with no logical address; and
   a second controller configured to maintain, in the memory, block mapping indicating block categorization of physical blocks of the nonvolatile semiconductor memory, which includes a first input block for writing data responsive to the write command with a logical address and a second input block for writing data responsive to the write command with no logical address, and to access the nonvolatile semiconductor memory, such that when the second controller receives, via the first controller, the write command with a logical address that is of the first type, the second controller returns, to the host device, via the first controller, a logical write completion notification, determines a physical location of the first input block in which data associated with the write command are to be written, writes the data in the determined physical location, and stores an address mapping from the logical address to the physical location in the memory, when the second controller receives, via the first controller, the write command with a logical address that is of the second type, the second controller returns, to the host device, via the first controller, a logical write completion notification, determines a physical location of the first input block in which data associated with the write command are to be written, writes the data in the determined physical location, returns, to the host device, via the first controller, a physical write completion notification and the physical location, and stores an address mapping from the logical address to the physical location in the memory, and when the second controller receives, via the first controller, the write command with no logical address, the second controller determines a physical location of the second input block in which data associated with the write command are to be written, writes the data in the determined physical location, and returns the determined physical location.

2. The storage device according to claim 1, wherein when the second controller receives, via the first controller, the write command with the logical address that is of the first type or the second type, the second controller returns, to the host device, via the first controller, the logical write completion notification before writing the data in the determined physical location, and when the second controller receives, via the first controller, the write command with no logical address, the second controller returns, to the host device, via the first controller, a completion notification after writing the data in the determined physical location.

3. The storage device according to claim 1, wherein when the write command with the logical address is of the second type, the second controller returns, to the host device, via the first controller, the logical write completion notification before writing the data in the determined physical location, and returns the physical location after writing the data in the determined physical location.

4. The storage device according to claim 1, wherein the second controller is further configured to maintain, in the memory, logical-to-physical mapping, with respect to at least part of data stored in the nonvolatile semiconductor memory.

5. The storage device according to claim 4, wherein when the second controller receives from the host device, via the first controller, a read command with a logical address and no physical location, the second controller determines a physical location corresponding to the logical address by referring to the logical-to-physical mapping, and reads data from the physical location, and when the second controller receives from the host device, via the first controller, a read command with a physical location and no logical address, the second controller read data from the physical location without referring to the logical-to-physical mapping.

6. The storage device according to claim 4, wherein when the second controller receives from the host device, via the first controller, a trim command with a logical address and no physical location, the second controller invalidates mapping for the logical address associated with the trim command in the logical-to-physical mapping, and when the second controller receives from the host device, via the first controller, an invalidate command with a physical location and no logical address, the second controller remaps a physical block including the physical location as a free block that includes no valid data, in the block mapping.

7. The storage device according to claim 4, wherein when the second controller receives from the host device, via the first controller, a garbage collection command, the second controller:

selects a target block of garbage collection from the blocks for logical access;

transfers valid data in the target block to another physical block; and updates the logical-to-physical mapping.

8. A storage device comprising:

a nonvolatile semiconductor memory;

a memory;

a first controller configured to receive commands from a host device including a read command with a logical address and no physical location, and a read command with a physical location and no logical address; and a second controller configured to maintain, in the memory, block mapping indicating block categorization of physical blocks of the nonvolatile semiconductor memory, which includes a first input block for writing data responsive to a write command with a logical address and a second input block for writing data responsive to a write command with no logical address, to access the nonvolatile semiconductor memory, and to maintain logical-to-physical mapping in the memory, such that when the second controller receives, via the first controller, the read command with a logical address and no physical location, the second controller determines a physical location of the first input block corresponding to the logical address by referring to the logical-to-physical mapping, and reads data from the physical location, and when the second controller receives, via the first controller, the read command with a physical location that is mapped to a logical address in the logical-to-physical mapping, and no logical address, the second controller reads data from the physical location of the second input block without referring to the logical-to-physical mapping.

9. The storage device according to claim 8, wherein when the second controller receives from the host device, via the first controller, a trim command with a logical address and no physical location, the second controller invalidates mapping for the logical address associated with the trim command in the logical-to-physical mapping, and when the second controller receives from the host device, via the first controller, an invalidate command with a physical location and no logical address, the second controller remaps a physical block including the physical location as a free block that includes no valid data, in the block mapping.

10. The storage device according to claim 8, wherein when the second controller receives from the host device, via the first controller, a garbage collection command, the second controller:
selects a target block of garbage collection from the blocks for logical access;
transfers valid data in the target block to another physical block; and
updates the logical-to-physical mapping.

11. A storage device comprising:
a nonvolatile semiconductor memory including a plurality of physical blocks;
a memory;
a first controller configured to receive commands from a host device including a write command with a logical address, which is of either a first type or a second type, and a write command with no logical address; and
a second controller configured to
maintain block mapping indicating block categorization of the physical blocks of the nonvolatile semiconductor memory, which includes a first input block for writing data responsive to the write command with a logical address and a second input block for writing data responsive to the write command with no logical address,
when the second controller receives, via the first controller, the write command with a logical address that is of the first type, return, to the host device, via the first controller, a logical write completion notification and write data into a physical block that is categorized as the first input block in the block mapping,
when the second controller receives, via the first controller, the write command with a logical address that is of the second type, return, to the host device, via the first controller, a logical write completion notification, write data into a physical block that is categorized as the first input block in the block mapping, and return, to the host device, via the first controller, a physical write completion notification and a physical location of the physical block, and
when the second controller receives, via the first controller, the write command with no logical address, write data into a physical block that is categorized as the second input block in the block mapping.

12. The storage device according to claim 11, wherein the second controller returns, to the host device, via the first controller, the logical write completion notification before writing the data in the first input block, and returns a completion notification after writing the data in the second input block.

13. The storage device according to claim 11, wherein when the write command with the logical address is of the second type, the second controller returns, to the host device, via the first controller, the physical location after writing the data in the first input block.

14. The storage device according to claim 1, wherein the physical blocks includes a first pool of active blocks in which write data associated write commands with a logical address have been written, a second pool of active block in which write data associated write commands with no logical address have been written, and a third pool of free blocks that are generated as a result of garbage collection performed on target physical blocks, and
for each garbage collection that is performed on the target physical blocks, the second controller selects the target physical blocks from either the first pool of active blocks or the second pool of active blocks, but not both.

15. The storage device according to claim 8, wherein the physical blocks includes a first pool of active blocks in which write data associated write commands with a logical address have been written, a second pool of active block in which write data associated write commands with no logical address have been written, and a third pool of free blocks that are generated as a result of garbage collection performed on target physical blocks, and
for each garbage collection that is performed on the target physical blocks, the second controller selects the target physical blocks from either the first pool of active blocks or the second pool of active blocks, but not both.

16. The storage device according to claim 11, wherein the physical blocks includes a first pool of active blocks in which write data associated write commands with a logical address have been written, a second pool of active block in which write data associated write commands with no logical address have been written, and a third pool of free blocks that are generated as a result of garbage collection performed on target physical blocks, and
for each garbage collection that is performed on the target physical blocks, the second controller selects the target physical blocks from either the first pool of active blocks or the second pool of active blocks, but not both.

* * * * *